US008468045B2

(12) United States Patent
Cavander et al.

(10) Patent No.: US 8,468,045 B2
(45) Date of Patent: Jun. 18, 2013

(54) AUTOMATED SPECIFICATION, ESTIMATION, DISCOVERY OF CAUSAL DRIVERS AND MARKET RESPONSE ELASTICITIES OR LIFT FACTORS

(75) Inventors: David Cavander, Los Angeles, CA (US); Wes Nichols, Los Angeles, CA (US); Jon Vein, Los Angeles, CA (US); Dominique Hanssens, Los Angeles, CA (US); Douglas A. Rae, Los Angeles, CA (US)

(73) Assignee: Marketshare Partners LLC, Santa Monica, CA (US)

( * ) Notice: Subject to any disclaimer, the term of this patent is extended or adjusted under 35 U.S.C. 154(b) by 0 days.

(21) Appl. No.: 13/544,871

(22) Filed: Jul. 9, 2012

(65) Prior Publication Data
US 2012/0316920 A1 Dec. 13, 2012

Related U.S. Application Data

(63) Continuation of application No. 12/609,440, filed on Oct. 30, 2009, now Pat. No. 8,244,571.

(60) Provisional application No. 61/110,514, filed on Oct. 31, 2008.

(51) Int. Cl.
*G06Q 30/00* (2012.01)
*G06Q 10/00* (2012.01)

(52) U.S. Cl.
USPC .... 705/7.31; 705/7.37; 705/14.43; 705/14.52

(58) Field of Classification Search
USPC .......................... 705/7.31, 7.37, 14.43, 14.52
See application file for complete search history.

(56) References Cited

U.S. PATENT DOCUMENTS

| | | | |
|---|---|---|---|
| 6,567,786 | B1 | 5/2003 | Bibelnieks et al. |
| 7,062,447 | B1 | 6/2006 | Valentine et al. |
| 7,110,960 | B2 | 9/2006 | Phillips et al. |
| 7,379,890 | B2 | 5/2008 | Myr et al. |
| 2002/0116237 | A1 | 8/2002 | Cohen et al. |
| 2002/0116348 | A1 | 8/2002 | Phillips et al. |
| 2002/0184109 | A1 | 12/2002 | Hayet et al. |
| 2003/0101087 | A1 | 5/2003 | Walker et al. |

(Continued)

FOREIGN PATENT DOCUMENTS
WO    WO 2006/093484    9/2006

OTHER PUBLICATIONS

Japanese Patent Office, Office Action and English Translation for JP2009-554723, Oct. 9, 2012.

(Continued)

*Primary Examiner* — Donald L. Champagne
(74) *Attorney, Agent, or Firm* — Perkins Coie LLP

(57) ABSTRACT

In some embodiments, a software facility performs a method of automated specification of models, estimation of elasticities, and discovery of drivers using the framework(s) discussed elsewhere herein is provided. The facility first obtains the client, business, and/or brand goals in terms of profit optimization, volume or revenue goals, acquisition of new customers, retention of customers, share of wallet and upsell. In conjunction with these goals, the facility obtains cross-section meta-data related to the planning time horizon, markets, geographies, channels of trade and customer segments. In combination, the goals and meta-data define the structure of the data stack and the number of demand generation equations that are needed.

25 Claims, 49 Drawing Sheets

U.S. PATENT DOCUMENTS

| | | | |
|---|---|---|---|
| 2003/0130883 A1 | 7/2003 | Schroeder et al. | |
| 2003/0187767 A1 | 10/2003 | Crites et al. | |
| 2003/0229536 A1 | 12/2003 | House | |
| 2004/0093296 A1 | 5/2004 | Phelan et al. | |
| 2004/0162749 A1 | 8/2004 | Vogel et al. | |
| 2004/0210543 A1 | 10/2004 | Ouimet | |
| 2004/0230470 A1 | 11/2004 | Svilar et al. | |
| 2005/0091094 A1 | 4/2005 | Wilson | |
| 2005/0125274 A1 | 6/2005 | Nastacio | |
| 2005/0149381 A1 | 7/2005 | Ravulapati et al. | |
| 2005/0154639 A1 | 7/2005 | Zetmeir | |
| 2005/0234718 A1 | 10/2005 | Ouimet et al. | |
| 2005/0256759 A1 | 11/2005 | Acharya et al. | |
| 2005/0256778 A1 | 11/2005 | Boyd et al. | |
| 2005/0256954 A1 | 11/2005 | Shapira et al. | |
| 2005/0273380 A1 | 12/2005 | Schroeder et al. | |
| 2006/0010022 A1 | 1/2006 | Kelly et al. | |
| 2006/0041480 A1 | 2/2006 | Briggs | |
| 2006/0047562 A1 | 3/2006 | Kiefer et al. | |
| 2006/0074749 A1 | 4/2006 | Kline et al. | |
| 2006/0117303 A1 | 6/2006 | Gizinski | |
| 2006/0277130 A1 | 12/2006 | Harmon | |
| 2007/0078790 A1 | 4/2007 | Kalyan | |
| 2007/0106550 A1 | 5/2007 | Umblijs et al. | |
| 2007/0112618 A1 | 5/2007 | Krneta | |
| 2007/0143186 A1 | 6/2007 | Apple et al. | |
| 2007/0162301 A1 | 7/2007 | Sussman et al. | |
| 2008/0065463 A1 | 3/2008 | Rosenberg et al. | |
| 2008/0086429 A1 | 4/2008 | Venkatraman et al. | |
| 2008/0097826 A1 | 4/2008 | Leach et al. | |
| 2008/0109296 A1 | 5/2008 | Leach et al. | |
| 2008/0133313 A1* | 6/2008 | Bateni et al. | 705/10 |
| 2008/0162211 A1 | 7/2008 | Addington | |
| 2008/0235073 A1 | 9/2008 | Cavander et al. | |
| 2008/0256011 A1 | 10/2008 | Rice et al. | |
| 2008/0270363 A1 | 10/2008 | Hunt et al. | |
| 2009/0144117 A1 | 6/2009 | Cavander et al. | |
| 2009/0216571 A1 | 8/2009 | Sunshine et al. | |
| 2009/0216597 A1 | 8/2009 | Cavander et al. | |
| 2010/0036700 A1 | 2/2010 | Cavander et al. | |
| 2010/0036722 A1 | 2/2010 | Cavander et al. | |
| 2010/0042477 A1 | 2/2010 | Cavander et al. | |
| 2010/0145793 A1 | 6/2010 | Cavander et al. | |
| 2011/0010211 A1 | 1/2011 | Cavander et al. | |

OTHER PUBLICATIONS

Yoshinaga, Yuki, "Management Science Models of Consumer Purchasing Bahevior," Taga Publishing Col, Ltd., Jul. 15, 2003, 1st edition, pp. 186-193.

Albers, Sonke et al., "A Meta-analysis of personal selling elasticities," MSI Reports Working Paper Series, 2008, Issue One, 08-001.

Dorfman, Robert et al., "Optimal advertising and optimal quality," The America Economic Review, Dec. 1954, vol. 44, No. 5, pp. 826-836.

Nijs, Vincent R. et al., "The category-demand effects of price promotions," Marketing Science, 2001, vol. 20, No. 1, pp. 1-22.

MarketShare Partners MarketShare Analytics/Resource Allocation Analytics Study method—http://web.archive.org/web/20070112162217/www.marketsharepartners.com/msroi/html, dated Jan. 12, 2007.

MarketShare Partners MarketShare 360, The next era in cross-channel attribution and measurement, MarketShare webpages, dated 2012.

Interactive Advertising Bureau (IAB) IAB Research Confirms Digital's Place in Optimal Marketing Mix, IAN webpages 2010 http://www.lab.net/about_the_lab/recent_press_releases/press_release_archive/press_release/pr-080210, dated Aug. 2, 2012.

United States Patent and Trademark Office, International Search Report and Written Opinion for PCT/US08/57559 dated Aug. 1, 2008.

United States Patent and Trademark Office, International Search Report and Written Opinion for PCT/US08/72391 dated Nov. 5, 2008.

United States Patent and Trademark Office, International Search Report and Written Opinion for PCT/US08/85087 dated Feb. 6, 2009.

United States Patent and Trademark Office, International Search Report and Written Opinion for PCT/US09/34768 dated Apr. 7, 2009.

United States Patent and Trademark Office, International Search Report and Written Opinion for PCT/US09/53194 dated Sep. 15, 2009.

United States Patent and Trademark Office, International Search Report and Written Opinion for PCT/US09/53910 dated Sep. 21, 2009.

United States Patent and Trademark Office, International Search Report and Written Opinion for PCT/US09/53917 dated Sep. 30, 2009.

United States Patent and Trademark Office, International Search Report and Written Opinion for PCT/US09/54070 dated Oct. 6, 2009.

United States Patent and Trademark Office, International Search Report and Written Opinion for PCT/US09/62730 dated Dec. 23, 2009.

United States Patent and Trademark Office, International Search Report and Written Opinion for PCT/US12/49782 dated Aug. 31, 2012.

* cited by examiner

MSP Compass

| Home | Profile | Scenarios | Tutorial | Case Study | Sign Out

Welcome, dave@anycompany.com

US English ▶

Edit Profile

Compass: Scenario XYZ | Description

▶ Step 1 > Step 2 > Step 3 > Step 4 >

Current Revenue ($) — 601
$250,000,000

Current annual marketing spending ($) — 602
$49,000,000

What is your anticipated growth rate for 1 year ahead for your industry? — 603
▲
10%
▼

Gross Profit (% of Revenue) — 604
▲
40%
▼

Market Share (% Dollars) — 605
▲
10%
▼

Save — 698
Continue > — 699

©2007 MSP ~ Compass Home ~ Terms of Service ~ Privacy Policy ~ Contact Us

*FIG. 6*

MSP Compass

Edit Profile | Home | Profile | Scenarios | Tutorial | Case Study |
Welcome, dave@anycompany.com | Sign Out US English ▶

Compass: Scenario XYZ | Description

▶ Step 1 > Step 2 > Step 3 > Step 4 >

Which describes your industry? — 701
- ✓ very new
- ☐ fairly new
- ☐ fairly established
- ☐ very mature Which describes your market? — 702
- ☐ very new
- ☐ fairly new
- ✓ fairly established
- ☐ very mature Which describes your channel? — 703
- ☐ very new
- ✓ fairly new
- ☐ fairly established
- ☐ very mature What is the innovation level of your marketing? — 704
- ☐ very new
- ☐ fairly new
- ☐ fairly established
- ✓ very mature Save | Continue >

© 2007 MSP ~ Compass Home ~ Terms of Service ~ Privacy Policy ~ Contact Us

*FIG. 7*

MSP Compass

| Home | Profile | Scenarios | Tutorial | Case Study |
Welcome, dave@anycompany.com | Sign Out
US English ▶

Edit Profile

Compass: Scenario XYZ | Description

▶ Step 1 > Step 2 > Step 3 > Step 4 >

What is the information content of
your marketing focus this year?  } 801
☐ A lot of new content
☑ A mix of old and new content
☐ Established content to sustain How would you characterize
your market share?  } 803
☐ Low and declining
☑ Low and increasing
☐ High and declining
☐ High and increasing How would you characterize
your company?  } 802
☐ Industry leader
☑ Top contender
☐ New entrant to the field
☐ Specialty or niche position How would you characterize
your pricing strategy?  } 804
☐ Deep discount or price-focused position
☑ Premium or high-end position

[Save] [Continue >]

© 2007 MSP – Compass Home – Terms of Service – Privacy Policy – Contact Us

*FIG. 8*

MSP Compass

US English ▼

| Home | Profile | Scenarios | Tutorial | Case Study |

Edit Profile    Welcome, dave@anycompany.com | Sign Out

Compass: Scenario XYZ | Description

Step 1 > Step 2 > Step 3 > Step 4 >

Would you like to include customer segment detail? ⟩ 901
☐ Yes  ☑ No

Please click an area on the chart to plot your assessment of your branding, messaging, and positioning Clarity 911: Excellent, Good, Fair, Poor
913 — Below Normal, Typical, Better than Normal, Break Thru
910
912 Consistency Please click an area on the chart to plot your assessment of your advertising Likeability 921: Excellent, Good, Fair, Poor
923 — Below Normal, Typical, Better than Normal, Break Thru
920
922 Persuasiveness

[ Save ]  [ Continue > ]

©2007 MSP – Compass Home – Terms of Service – Privacy Policy – Contact Us

MSP Compass

US English

| Home | Profile | Scenarios | Tutorial | Case Study |

Compass: Scenario XYZ
Description area for information

Welcome, dave@anycompany.com | Sign Out

| Home | Market Share | Spending Mix | P&L |

[ Save ]  [ Optimize > ]

Budget:
(Accept or enter new amount)
$55,000,000
Default Budget
$49,000,000

Special Issue Setting:
(Please select either Yes or No for the following questions
Y  N
☐  ☑  Include both Brand and Product Media spending?
☑  ☐  Is this the launch of a New Product?

| | Current (1204) | Ideal (1205) | Brand ($) (1206) | Product ($) (1207) | Total $ Amount Difference: Current vs. Ideal (1208) |
|---|---|---|---|---|---|
| 1211 TV - National Network | 30% | 37% | $12,210 | $8,140 | (5,650) |
| 1212 TV - Cable | 20% | 19.5% | $6,435 | $4,290 | (925) |
| 1213 Radio | 5% | 5% | $1,650 | $1,100 | (300) |
| 1214 Print | 15.0% | 10% | $3,300 | $2,200 | 1,850 |
| 1215 Outdoor | 2% | 2% | $660 | $440 | 120 |
| 1216 Internet Search | 2.5% | 6% | $1,980 | $1,320 | (2,075) |
| 1217 Internet Banner | 2.5% | 2% | $660 | $440 | 120 |
| 1218 Local Events/Sponsorship | 5% | 2.5% | $825 | $550 | 1,075 |
| 1219 Global Events/Sponsorship | 5% | 3% | $990 | $660 | 800 |
| 1220 Other Digital Media | 2% | 2% | $660 | $440 | (120) |
| 1221 Direct/1:1 | 5% | 6% | $1,980 | $1,320 | (850) |
| 1222 PR/Buzz | 6% | 5% | $1,650 | $1,100 | 190 |
| | 100% | | $33,000 | $22,000 | $6,000 |

Customize Report: (Please select the brands you would like to compare)

1231 ☑ TV    1232 ☑ Radio    1233 ☑ Print    1234 ☐ Outdoor    1235 ☐ Internet Search    1236 ☐ Internet Banner    1237 ☐ Local Events Sponsorship    1238 ☐ Global Events Sponsorship    1239 ☐ Other Digital Media    1240 ☐ Direct 1:1    1241 ☐ PR/Buzz 1250 — TV-National & Cable
Current  1252      Brand: $8,820 — Product: $5,880  1254   Ideal   1257
TV-Nat'l [ 30% ] 1251              TV-Nat'l [ 37% ] 1256
TV-Cable [ 20% ] 1253              TV-Cable [ 19.5% ] 1258

1260 — Radio
Current [ 5% ] 1262
Ideal   [ 5% ] 1263

1270 — Print
Current [ 15% ] 1272
Ideal   [ 10% ] 1273

1298 [ Save ]   1299 [ Optimize > ]

©2007 MSP – Compass Home – Terms of Service – Privacy Policy – Contact Us

*FIG. 12*

COMPASS KEY STEPS (1-6 BELOW)     OUTLINE     COMPASS MEDIA

DETERMINE
CONTEXT

1. Who is the target market for the brand or business?
    1.1 ☐ Adults, 18-49, both Male and Female
    1.2 ☐ Adults, 18-49, primarily Male
    1.3 ☐ Adults, 18-49, primarily Female
    1.4 ☐ Youth, Ages 15-22
    1.5 ☐ Children, Under Age 15
    1.6 ☐ Adults, 50+

2. Please describe the business or product category
    2.1    Consumer Involvement
            ☐ low    ☐ medium    ☐ high
    2.2    What level of information is needed by the customer
            ☐ low    ☐ medium    ☐ high
    2.3    Type of product or service
            ☐ durables    ☐ non-durables
            ☐ consumer product    ☐ industrial product
    2.4    Is the product or service
            ☐ a luxury or premium positioned brand
            ☐ high priced relative to norms
            ☐ superior in quality 3. Please describe the business, product's or service's share of voice
    3.1 ☐ typical/average
    3.2 ☐ above average
    3.3 ☐ below average 4. What is the primary goal of the communications
    4.1 ☐ convey information
    4.2 ☐ develop liking and emotional value
    4.3 ☐ reinforce habits 5. What is the stage of life of the business, product or service
    5.1 ☐ New
    5.2 ☐ Established
    5.3 ☐ Mature
    5.4 ☐ Other 6. What is the Reach objective over 12 months for the communications
    ☐ Percent of Target 7. What is the duration of the customer's usage or buying cycle
    7.1 ☐ Frequently, daily or weekly
    7.2 ☐ Seasonal
    7.3 ☐ Once a year/annually
    7.4 ☐ Once every 2-3 years
    7.5 ☐ Once in 10 years/
    7.6 ☐ Special 8. Please describe the customer's prior experience, if any, with the business, product or service
    ☐ None    ☐ Positive Word of Mouth
    ☐ Average    ☐ Below Average 9. Is brand "personality" considered a differentiator in the cateogry
    ☐ Yes    ☐ No 10. To what extent is the business, product or service required to be supported
    ☐ Nationally    ☐ Locally

| | | | Preliminary initial mix of resources (if consumer product) | | Percentages | | | | Rec'd Media Mix (starting, pre-adjustments) | | | | | |
|---|---|---|---|---|---|---|---|---|---|---|---|---|---|---|
| | | Starting Allocations Weights for Freq Calcs | | Cognition score | High High | High Low | Low High | Medium Medium | High Medium | Medium High | Low Low if national | Low Medium | Medium Low | Medium Low |
| | | | | Affect score | High | Low | High | Medium | Medium | High | Low | Medium | Low | Low |
| | | | | | 1 | 2 | 3 | 4 | 5 | 6 | 7 | 8 | 9 | |
| Compass Budget Deal $10,000,000 | | | | | | | | | | | | | | |
| | $5,000,000 | 50 | | TV | 44 | 20 | 60 | 50 | 100 | 50 | 65 | 55 | 50 | |
| | $0 | 10 | | Print - magazines | 12 | 25 | 5 | 10 | 100 | 10 | 0 | 5 | 10 | |
| | $0 | 5 | | Print – newspapers | 0 | 5 | 0 | 5 | 100 | 0 | 5 | 0 | 5 | |
| | $500,000 | 10 | | Radio | 5 | 5 | 5 | 10 | 100 | 5 | 10 | 15 | 10 | |
| | $0 | 0 | | Outdoor | 0 | 0 | 5 | 0 | 100 | 0 | 0 | 5 | 0 | |
| | $0 | 5 | | Internet – search | 10 | 20 | 5 | 5 | 100 | 10 | 10 | 5 | 10 | |
| | $25,000 | 5 | | Internet – ad words | 5 | 10 | 5 | 5 | 100 | 5 | 10 | 5 | 10 | |
| | $0 | 5 | | Direct marketing | 12 | 15 | 0 | 5 | 100 | 5 | 0 | 0 | 5 | |
| | $0 | 5 | | Sponsorships/events | 7 | 0 | 5 | 5 | 100 | 10 | 0 | 5 | 0 | |
| | $1,250 | 5 | | PR/other | 5 | 0 | 10 | 5 | 100 | 5 | 0 | 5 | 0 | |
| | $0 | 0 | | Street | 0 | 0 | 5 | 0 | 100 | 0 | 0 | 0 | 0 | |
| | | | | Sub-total | 100 | 100 | 100 | 100 | 100 | 100 | 100 | 100 | 100 | |

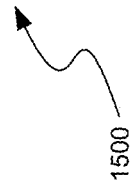

*FIG. 15*

Determine reach and frequency factors for min persuasion and minimum impressions by type

| | Purchased Reach | Type | Effective % of target (reach) | FREQ WTS cf to C1112 | Frequency per Cust. Minimum No. Exposures/Impressions per Purchase Cycle | No. Purchase cycles per year | Total Annual calc total no. impressions | CPI Ballpark 2007 Cost per impression $$ per | Total Est. Min Spending by Type |
|---|---|---|---|---|---|---|---|---|---|
| TARGET REACH | 6,260,000 | TV | 80 | 0.516 | 1.6 | 26 | 260,000,000 | 0.03 | $7,800,000 |
| SIZE OF TARGET | | Print - magazines | | 0.032 | 0.1 | 26 | 16,250,000 | 0.01 | $162,500 |
| AUDIENCE | | Print -- newspapers | | 0.032 | 0.1 | 26 | 16,250,000 | 0.005 | $81,250 |
| 5000000 | | Radio | | 0.032 | 0.1 | 26 | 16,250,000 | 0.0025 | $40,625 |
| | | Outdoor | | 0.032 | 0.1 | 26 | 16,250,000 | 0.01 | $162,500 |
| | | Internet -- search | | 0.065 | 0.2 | 26 | 32,500,000 | 0.01 | $325,000 |
| | | Internet -- ad words | | 0.161 | 0.5 | 26 | 81,250,000 | 0.01 | $812,500 |
| | | Direct marketing | | 0.032 | 0.1 | 26 | 16,250,000 | 0.03 | $487,500 |
| | | Sponsorships/events | | 0.032 | 0.1 | 26 | 16,250,000 | 0.001 | $16,250 |
| | | PR/other | | 0.032 | 0.1 | 26 | 16,250,000 | 0.005 | $81,250 |
| | | Street | | 0.032 | 0.1 | 26 | 16,250,000 | 0.01 | $162,500 |
| | | | | WTD sum | 3.1 | | 503,750,000 | Sub-total | $10,131,875 |

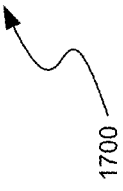

AUTOMATED SPECIFICATION, ESTIMATION, DISCOVERY OF CAUSAL DRIVERS AND MARKET RESPONSE ELASTICITIES OR LIFT FACTORS

CROSS-REFERENCE TO RELATED APPLICATION(S)

The present application is a continuation of U.S. patent application Ser. No. 12/609,440, filed Oct. 30, 2009, now U.S. Pat. No. 8,244,571 which claims the benefit of U.S. Provisional Patent Application No. 61/110,514, filed Oct. 31, 2008, both of which are incorporated in their entirety herein by reference.

The present application is related to the following applications, each of which is hereby incorporated by reference in its entirety: U.S. Provisional Patent Application No. 60/895,729, filed Mar. 19, 2007, U.S. Provisional Patent Application No. 60/991,147, filed Nov. 29, 2007, U.S. Provisional Patent Application No. 61/084,252, filed Jul. 28, 2008, and U.S. Provisional Patent Application No. 61/084,255, filed Jul. 28, 2008.

TECHNICAL FIELD

The described technology is directed to the field of automated decision support tools, and, more particularly, to the field of automated budgeting tools.

BACKGROUND

Marketing communication ("marketing") is the process by which the sellers of a product or a service—i.e., an "offering"—educate potential purchasers about the offering. Marketing is often a major expense for sellers, and is often made of a large number of components or categories, such as a variety of different advertising media and/or outlets, as well as other marketing techniques. Despite the complexity involved in developing a marketing budget attributing a level of spending to each of a number of components, few useful automated decision support tools exists, making it common to perform this activity manually, relying on subjective conclusions, and in many cases producing disadvantageous results.

In the few cases where useful decision support tools exist, it is typically necessary for the tool's user to provide large quantities of data about past allocations of marketing resources to the subject offering, and the results that that they produced. In many cases, such as in the cases of a new offering, such data is not available. Even where such data is available, it can be inconvenient to access this data and provide it to the decision support tool.

Accordingly, a tool that automatically prescribed an advantageous allocation of funds or other resources to an offering and its various components without requiring the user to provide historical performance data for the offering would have significant utility.

BRIEF DESCRIPTION OF THE DRAWINGS

FIGS. 6-9 show displays presented by the facility in order to solicit information about the subject offering for which an overall marketing budget and its distribution are to be prescribed by the facility.

FIG. 10 is a display diagram showing a result navigation display presented by the facility after collecting information about the subject offering to permit the user to select a form of analysis for reviewing results.

FIG. 12 is a display presented by the facility to show spending mix information. The display includes an overall budget 1201 prescribed by the facility.

FIG. 13 is a process diagram that describes collecting additional offering attribute information from the user.

FIG. 15 is a table diagram showing sets of marketing activity allocations, each for a different combination of the three derived attributes shown in FIG. 14.

FIG. 17 is a process diagram showing how the facility determines dollar amount for spending on each marketing activity.

FIGS. 24-49 are display diagrams showing a typical user interface presented by the facility in connection with the ACE process.

DETAILED DESCRIPTION

Figure 1:
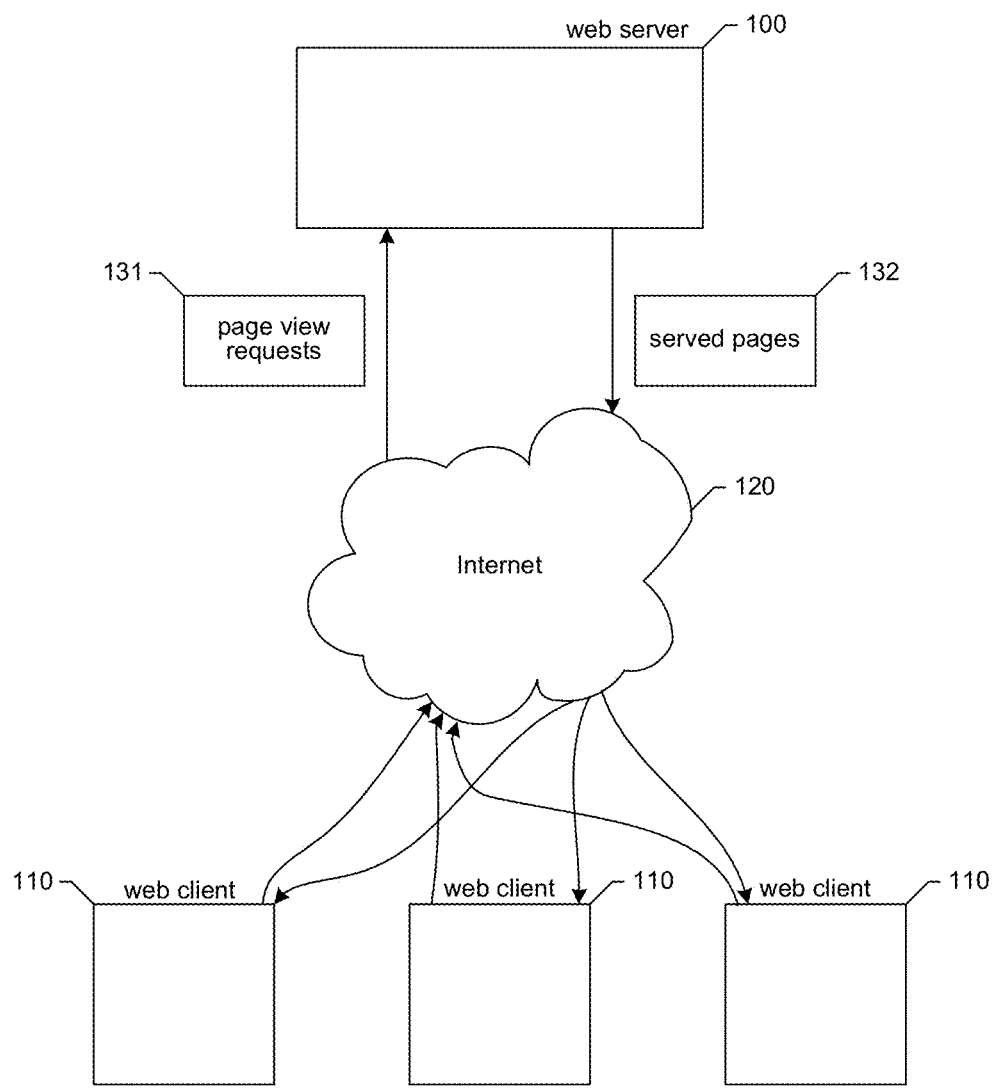
FIG. 1 is a high-level data flow diagram showing data flow within a typical arrangement of components used to provide the facility.

A software facility that uses a qualitative description of a subject offering to automatically prescribe both (1) a total budget for marketing and sales resources for a subject offering and (2) an allocation of that total budget over multiple spending categories—also referred to as "activities"—in a manner intended to optimize a business outcome such as profit for the subject offering based on experimentally-obtained econometric data ("the facility") is provided.

In an initialization phase, the facility considers data about historical marketing efforts for various offerings that have no necessary relationship to the marketing effort for the subject offering. The data reflects, for each such effort: (1) characteristics of the marketed offering; (2) total marketing budget; (3) allocation among marketing activities; and (4) business results. This data can be obtained in a variety of ways, such as by directly conducting marketing studies, harvesting from academic publications, etc.

The facility uses this data to create resources adapted to the facility's objectives. First, the facility calculates an average elasticity measure for total marketing budget across all of the historical marketing efforts that predicts the impact on business outcome of allocating a particular level of resources to total marketing budget. Second, the facility derives a number of adjustment factors for the average elasticity measure for total marketing budget that specify how much the average elasticity measure for total marketing budget is to be increased or decreased to reflect particular characteristics of the historical marketing efforts. Third, for the historical marketing efforts of each of a number groups of qualitatively similar offerings, the facility derives per-activity elasticity measures indicating the extent to which each marketing activity impacted business outcome for marketing efforts for the group.

The facility uses interviewing techniques to solicit a qualitative description of the subject offering from user. The facility uses portions of the solicited qualitative description to identify adjustment factors to apply to the average elasticity measure for total marketing budget. The facility uses a version of average elasticity measure for total marketing budget adjusted by the identified adjustment factors to identify an ideal total marketing budget expected to produce the highest level of profit for the subject offering, or to maximize some other objective specified by the user.

After identifying the ideal total marketing budget, the facility uses the solicited qualitative description of the subject offering to determine which of the groups of other offerings the subject offering most closely matches, and derives a set of ideal marketing activity allocations from the set of per-activity elasticity measures derived for that group.

In some embodiments, the facility considers data received from one or more of a number of types of external sources, including the following: syndicated media, syndicated sales data, internet media, internet behavioral data, natural search query data, paid search activity data, media data like television, radio, print, consumer behavioral data, tracking survey data, economic data, weather data, financial data like stock market, competitive marketing spend data, and online and offline sales data.

In some embodiments, the facility retrieves outcome and driver data from each of a number of third-party sources, using a predefined template for each source to guide the retrieval and mapping of this third-party data. In some embodiments, the facility uses the retrieved third-party data together with client-specific data about sales or one or more other business outcomes that is obtained from the client in order to generate recommended resource allocations for the client. In some cases, this can obviate the need to collect outcome and/or driver data from the client, often saving significant time and resources.

In this manner, the facility automatically prescribes a total marketing resource allocation and distribution for the subject offering without requiring the user to provide historical performance data for the subject offering.

The sales or market response curves determined by the facility predict business outcomes as mathematical functions of various resource drivers:

$$Sales = F(Any\ Set\ of\ Driver\ Variables),$$

where F denotes a statistical function with the proper economic characteristics of diminishing returns Further, since this relationship is based on data, either time series, cross-section, or both time series and cross-section, the method inherently yields direct, indirect, and interaction effects for the underlying conditions.

These effects describe how sales responds to changes in the underlying driver variables and data structures. Often, these response effects are known as "lift factors." As a special subset or case, these methods allow reading any on-off condition for the cross-sections or time-series.

There are various classes of statistical functions which are appropriate for determining and applying different types of lift factors. In some embodiments, the facility uses a class known as multiplicative and log log(using natural logarithms) and point estimates of the lift factors.

In certain situations, the facility uses methods which apply to categorical driver data and categorical outcomes. These include the, classes of probabilistic lift factors known as multinomial logit, logit, probit, non-parametric or hazard methods.

In various embodiments, the facility uses a variety of other types of lift factors determined in a variety of ways. Statements about "elasticity" herein in many cases extend to lift factors of a variety of other types.

FIG. 1 is a high-level data flow diagram showing data flow within a typical arrangement of components used to provide the facility. A number of web client computer systems 110 that are under user control generate and send page view requests 131 to a logical web server 100 via a network such as the Internet 120. These requests typically include page view requests and other requests of various types relating to receiving information about a subject offering and providing information about prescribed total marketing budget and its distribution. Within the web server, these requests may either all be routed to a single web server computer system, or may be loaded-balanced among a number of web server computer systems. The web server typically replies to each with a served page 132.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
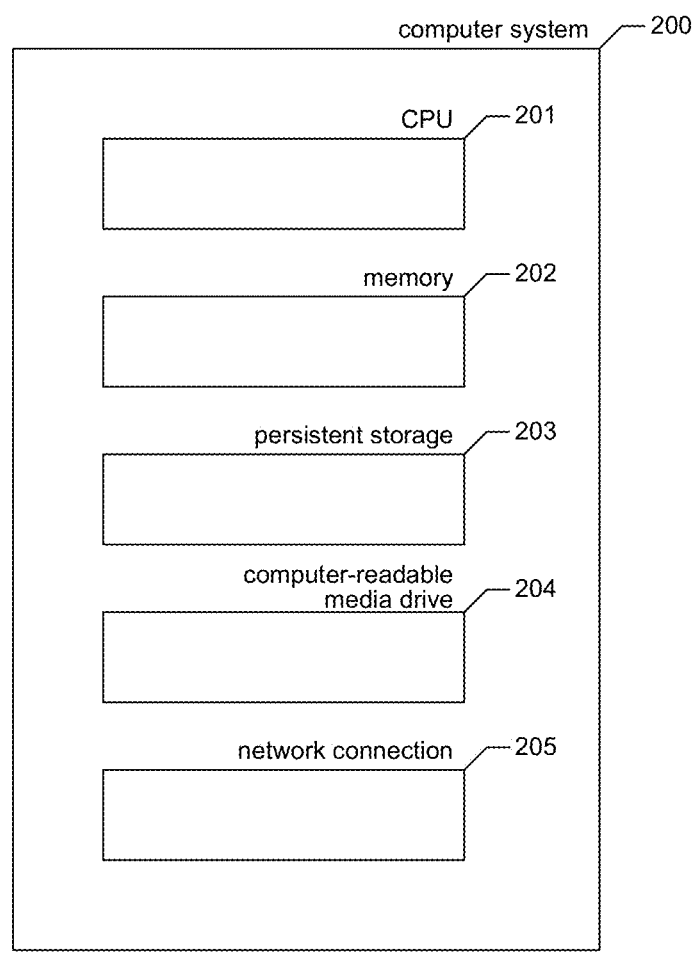
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
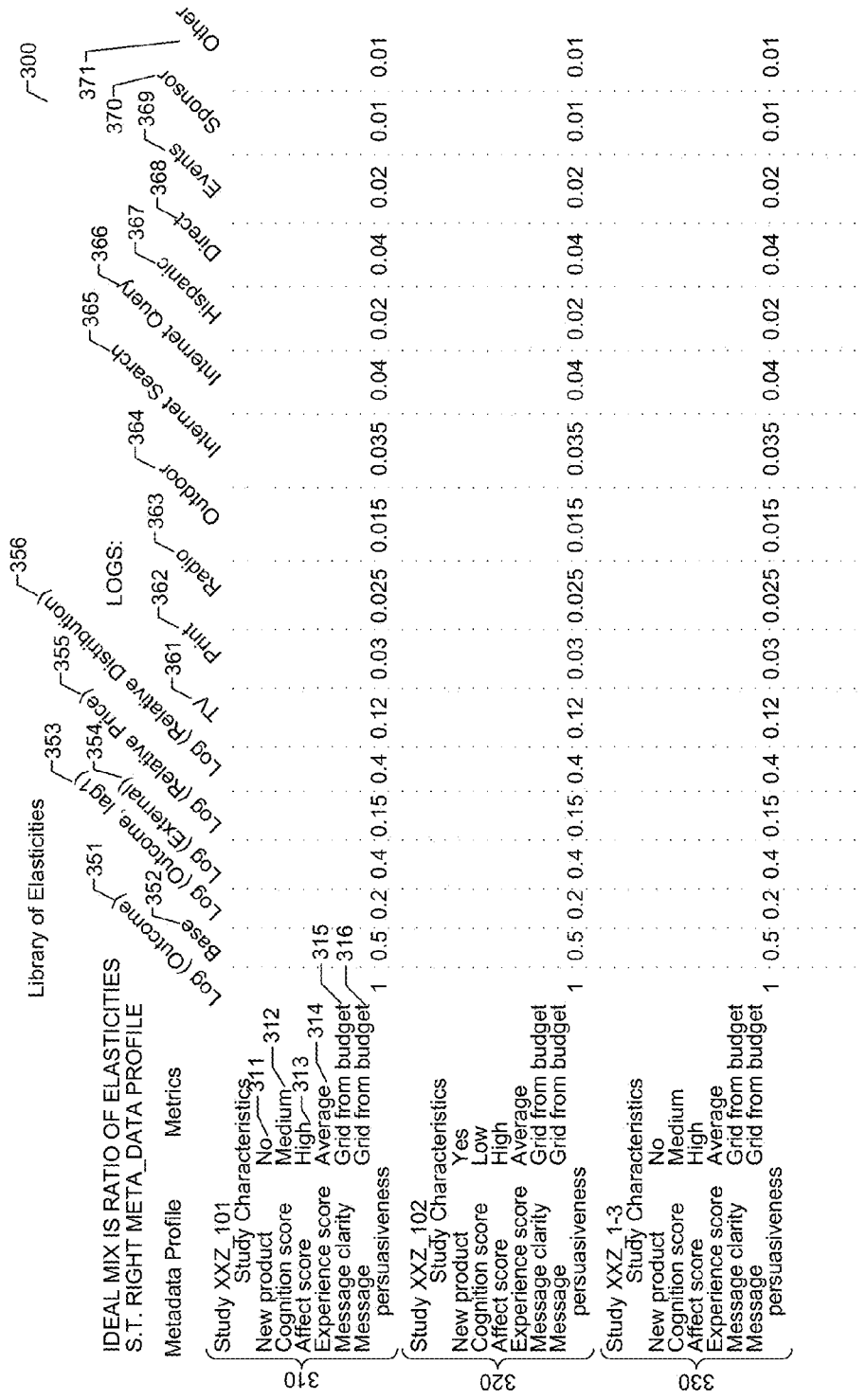
FIG. 3 is a table drawing showing sample contents of a library of historical marketing efforts.

FIG. 3 is a table drawing showing sample contents of a library of historical marketing efforts. The library 300 is made up of entries, such as entries 310, 320, and 330, each corresponding to a set of one or more historical marketing efforts each sharing a similar context. Each entry contains a number of context attribute values that hold true for the historical marketing efforts corresponding to the entry, including values for a new product attribute 311, a cognition score attribute 312, an affect score attribute 313, an experience score 314, a message clarity score 315, and a message persuasiveness score 316. Each entry further contains values for the following statistical measures for the historical marketing efforts corresponding to the entry: log of the outcome 351, base 352, log of outcome with a lag factor 353, log of external 354, log of relative price 355, and log of relative distribution 356. Each entry further contains logs of advertising efficiency values for each of a number of categories, including TV 361, print 362, radio 363, outdoor 364, Internet search 365, Internet query 366, Hispanic 367, direct 368, events 369, sponsorship 370, and other 371.

Figure 4:
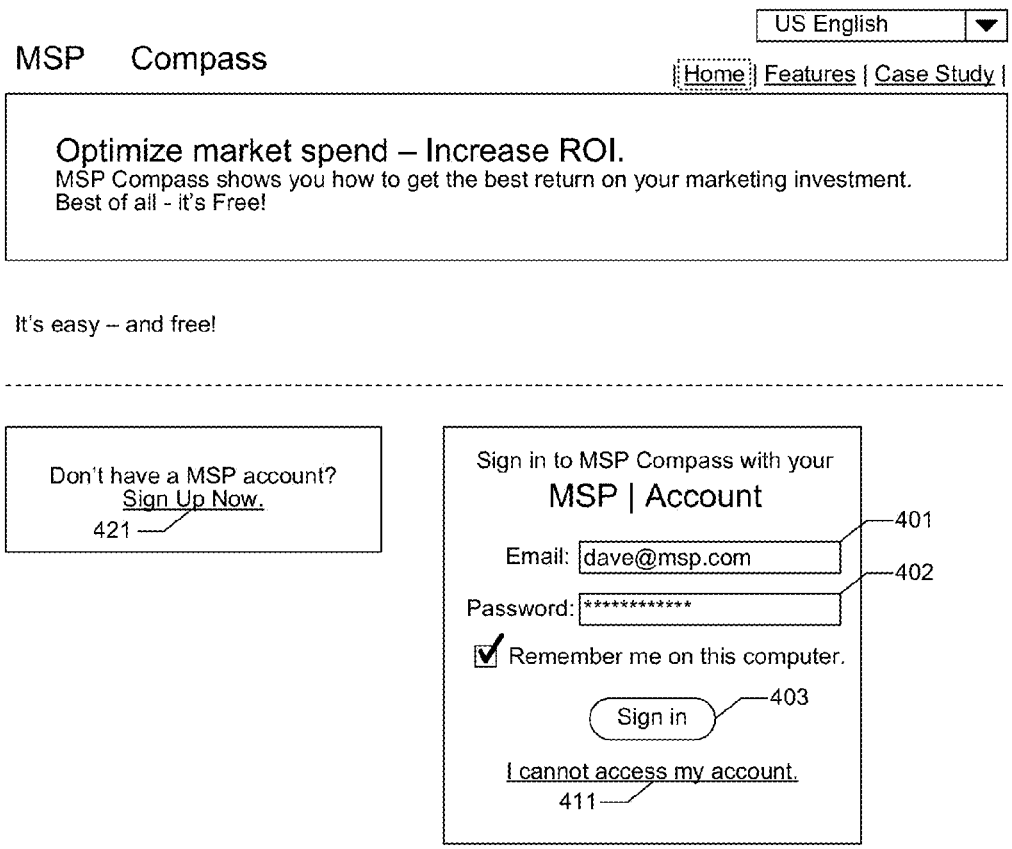
FIG. 4 is a display diagram showing a sign-in page used by the facility to limit access to the facility to authorized users.

FIG. 4 is a display diagram showing a sign-in page used by the facility to limit access to the facility to authorized users. A user enters his or her email address into field 401, his or her password into field 402, and selects a signing control 403. If the user has trouble signing in in this manner, the user selects control 411. If the user does not yet have an account, the user selects control 421 in order to create a new account.

Figure 5:
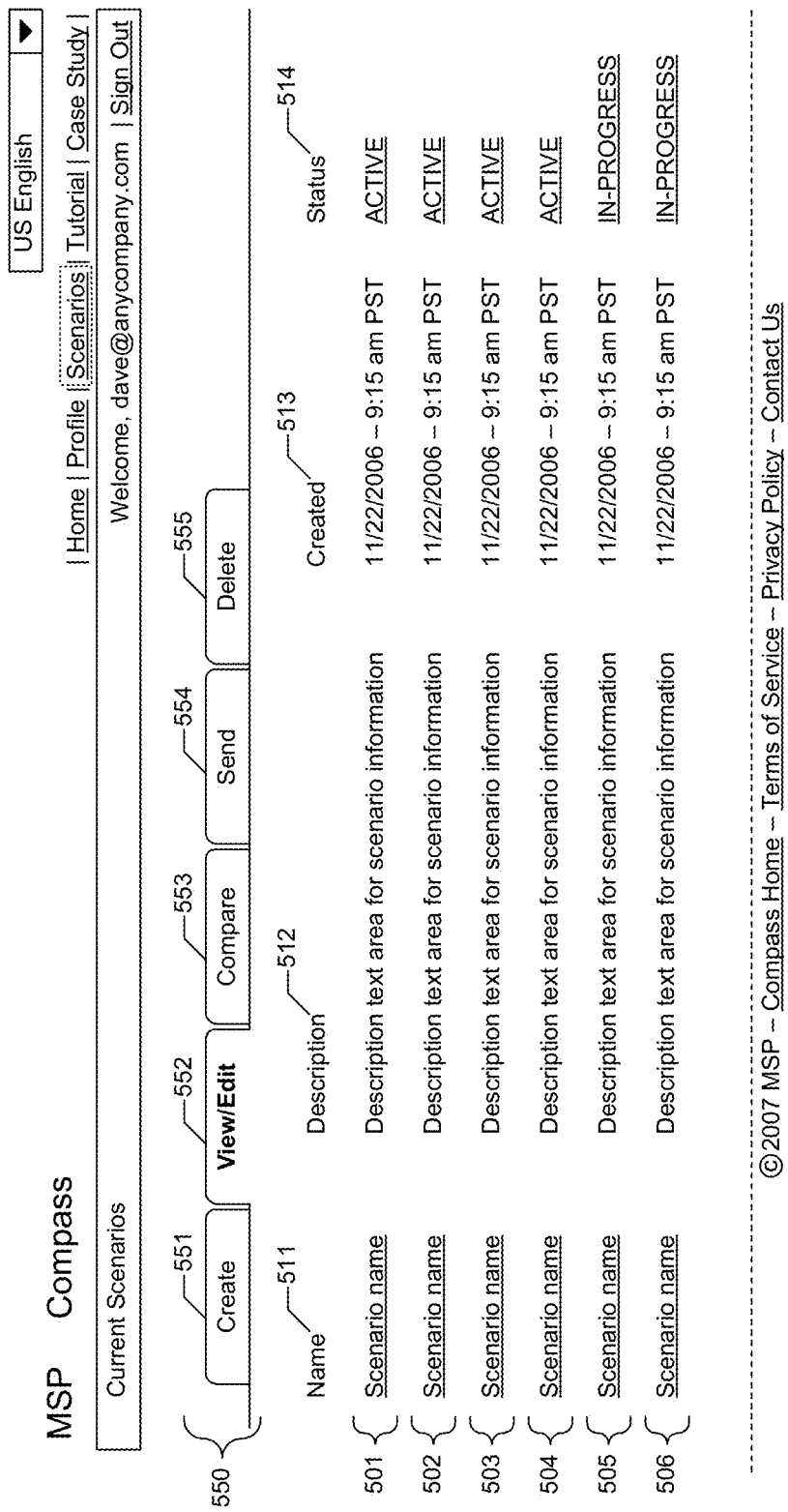
FIG. 5 is a flow diagram showing a page display generated by the facility in a view/edit mode.

FIG. 5 is a flow diagram showing a page display generated by the facility in a view/edit mode. The display lists a number of scenarios 501-506, each corresponding to an existing offering prescription generated for the user, or generated for an organization with which the user is associated. For each scenario, the display includes the name of the scenario 511, a description of the scenario 512, a date 513 on which the scenario was created, and a status of the scenario. The user may select any of the scenarios, such as by selecting its name, or its status, to obtain more information about the scenario. The display also includes a tab area 550 that the user may use in order to navigate different modes of the facility. In addition to tab 552 for the present view/edit mode, the tab area includes a tab 551 for a create mode, a tab 553 for a compare mode, a tab 554 for a send mode, and a tab 555 for a delete mode. The user can select any of these tabs in order to activate the corresponding mode.

FIGS. 6-9 show displays presented by the facility in order to solicit information about the subject offering for which an overall marketing budget and its distribution are to be prescribed by the facility. FIG. 6 shows controls for entering values for the following attributes: current revenue 601, current annual marketing spending 602, anticipated growth rate for the next year in the industry as a whole 603, gross profit expressed as a percentage of revenue 604, and market share expressed as a percentage of dollar 605. The display further includes a save control 698 that the user can select in order to save the attribute values that they have entered, and a continue control 699 that the user may select in order to proceed to the next display for entering the context attribute values.

FIG. 7 is a further display presented by the facility to solicit attribute values for the subject offering. It includes controls for inputting values for the following context attributes: industry newness 701, market newness 702, channel newness 703, and marketing innovation 704.

FIG. 8 is a further display presented by the facility in order to solicit attribute values. It has controls that the user may use to enter the values for the following context attributes: newness of marketing information content 801, company position in the market 802, market share 803, and pricing strategy 804.

FIG. 9 is a further display presented by the facility in order to solicit attribute values. It contains a control 901 that the user may use to determine whether customer segment detail will be included. The display further contains charts 910 and 920 for specifying values of additional context attributes. Chart 910 can be used by the user to simultaneously specify values for the consistency and clarity of branding messaging and positioning efforts by the company responsible for the subject offering. In order to use chart 910, the user selects a single cell in the grid included in the chart corresponding to appropriate values of both the consistency and clarity attributes. Section 920 is similar, enabling the user to simultaneously select appropriate values for the persuasiveness and likeability of the company's advertising.

Figure 10:
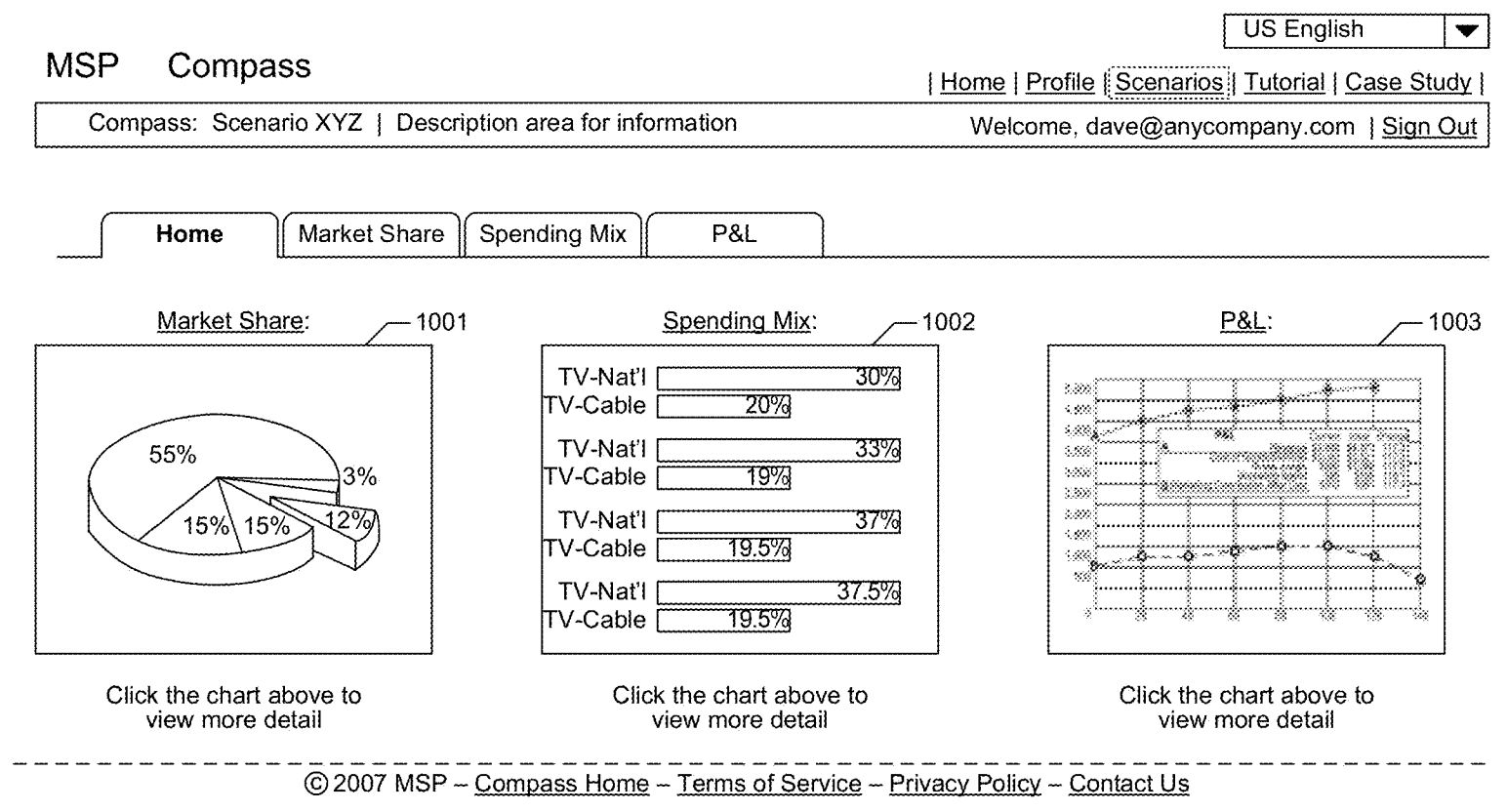

FIG. 10 is a display diagram showing a result navigation display presented by the facility after collecting information about the subject offering to permit the user to select a form of analysis for reviewing results. The display includes a control 1001 that the user may select in order to review market share information relating to the result, a control 1002 that the user may select in order to review spending mix information relating to the result, and a control 1003 that the user may select in order to review profit and loss information relating to the result.

Figure 11:
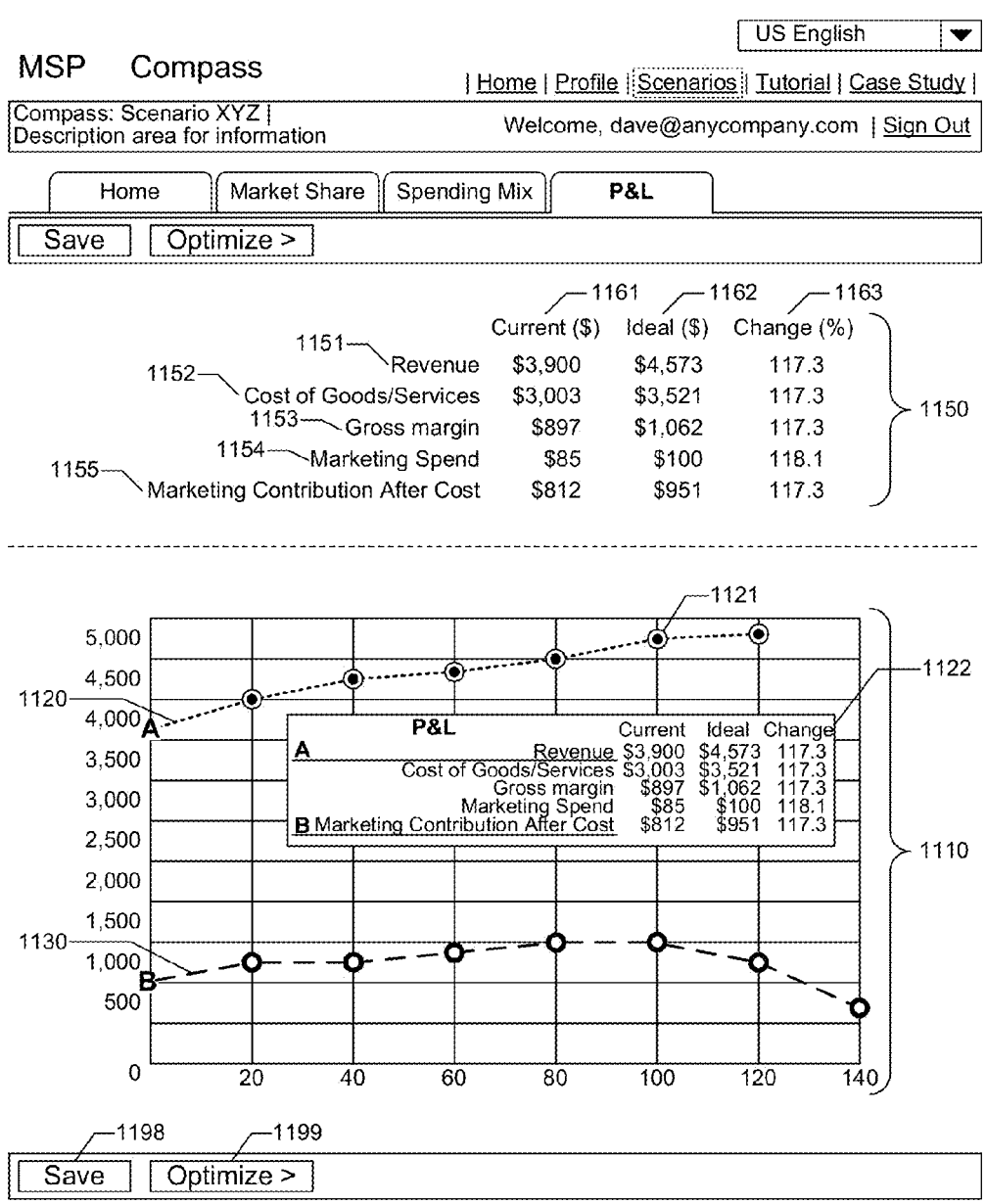
FIG. 11 is a display diagram showing a display presented by the facility to convey the optimal total marketing budget that the facility has is determined for the subject offering.

FIG. 11 is a display diagram showing a display presented by the facility to convey the optimal total marketing budget that the facility has determined for the subject offering. The display includes a graph 1110 showing two curves: revenue with respect to total marketing budget (or "marketing spend") 1120 and profit (i.e., "marketing contribution after cost") with respect to total marketing budget 1130. The facility has identified point 1131 as the peak of the profit curve 1130 and has therefore identified the corresponding level of marketing spend, $100, as the optimal marketing spend. The height of point 1131 shows the expected level of profit that would be produced by this marketing spend, and the height of point 1121 shows the expected level of total revenue that would be expected at this marketing spend. Table 1150 provides additional information about the optimal marketing spend and its calculation. The table shows, for each of current marketing spend 1161, ideal marketing spend 1162, and delta between these two 1163: revenue 1151 projected for this level of marketing spend; costs of goods and services 1152 anticipated to be incurred at this level of marketing spend; gross margin 1153 to be procured at this level of marketing spend; the marketing spend 1154; and the marketing contribution after cost 1155 expected at this level of marketing spend.

In order to define the profit curve and identify the total marketing budget level at which it reaches its peak, the facility first determines a total marketing budget elasticity appropriate for the subject offering. This elasticity value falls in a range between 0.01 and 0.30, and is overridden to remain within this range. The facility calculates the elasticity by adjusting an initial elasticity value, such as 0.10 or 0.11, in accordance with a number of adjustment factors each tied to a particular attribute value for the subject offering. Sample values for these adjustment factors are shown below in Table 1.

TABLE 1

|  | Industry Newness | Marketing Innovation | New Information | Market Share | Advertising Quality |
|---|---|---|---|---|---|
| High | .05 | .1 | .05 | −.03 | .04 |
| Medium | 0 | 0 | 0 | 0 | 0 |
| Low | −.02 | −.03 | −.02 | .02 | −.03 |

The industry newness column corresponds to control 701 shown in FIG. 7. For example, if the top check box in control 701 is checked, then the facility selects the adjustment factor 0.05 from the industry newness column; if either of the middle two boxes in control 701 are checked, then the facility selects the adjustment factor 0 from the industry newness column; and if the bottom checkbox in control 701 is checked, then the facility selects the adjustment factor −0.02 from the industry newness column. Similarly, the marketing innovation column corresponds to control 704 shown in FIG. 7, the new information column corresponds to control 801 shown in FIG. 8, and the market share column corresponds to control 803 shown in FIG. 8. The advertising quality column corresponds to charts 910 and 920 shown in FIG. 9. In particular, the sum of the positions of the cells selected in the two graphs relative to the lower left-hand corner of each graph is used to determine a high, medium, or low level of advertising quality.

The facility then uses the adjusted total marketing budget elasticity to determine the level of total marketing budget at which the maximum profit occurs, as is discussed in detail below in Table 2.

TABLE 2

Definitions:
Sales = S
Base = β
Marketing Spend = M
Elasticity = α
Cost of Goods Sold (COGS) = C
Profit = P (P is a function of S, C, and M, as defined in equation 2 below)
Fundamental equation relating Sales to Marketing (alpha and beta will be supplied)
Equation (1): $S = \beta * M^\alpha$
Equation relating Sales to Profits (C will be known), so that we can substitute for Sales in equation (1) above and set the program to maximize profits for a given alpha and beta.
Equation (2): $P = [S * (1 - C)] - M$
Solve Equation (2) for Sales:

$$\frac{(P + M)}{(1 - C)} = S$$

Substitute or S in Fundamental Equation:

$$\frac{(P + M)}{(1 - C)} = \beta * M^\alpha$$

Solve for P as a function of M, C, alpha and beta:
$P = [\beta * M^\alpha * (1 - C)] - M$
Now we have P as a function of M.
Take derivatives $$\frac{dP}{dM} = ([(1 - C)\beta\alpha] * M^{\alpha-1}) - 1$$

Set to zero to give local inflection point:
$1 = [(1 - C)\beta\alpha] * M^{\alpha-1}$
Solve for M $$M = \left(\frac{1}{[(1 - C)\beta\alpha]}\right)^{\frac{1}{\alpha-1}}$$

Check sign of second derivative (to see that it is a max not a min)
$[(1 - C)\beta\alpha(\alpha - 1)] * M^{\alpha-2} < 0?$ FIG. 12 is a display presented by the facility to show spending mix information. The display includes an overall budget 1201 prescribed by the facility. The user may edit this budget if desired to see the effect on distribution information shown below. The display also includes controls 1202 and 1203 that the user may use to identify special issues relating to the prescription of the marketing budget. The display further includes a table 1210 showing various information for each of a number of marketing activities. Each row 1211-1222 identifies a different marketing activity. Each row is further divided into the following columns: current percentage allocation 1204, ideal percentage allocation 1205, dollar allocation to brand in thousands 1206, dollar allocation to product in thousands 1207, and dollar difference in thousands between current and ideal. For example, from row 1214, it can be seen that the facility is prescribing a reduction in allocation for print advertising from 15% to 10%, $3.3 million of which would be spent on print advertising for the brand and $2.2 million of which would be spent on print advertising for the product, and that the current allocation to print marketing is $1.85 million greater than the ideal allocation. The display further includes a section 1230 that the user may use to customize a bar chart report to include or exclude any of the budget and marketing activities. It can be seen that the user has selected check boxes 1231-1233, causing sections 1250, 1260, and 1270 to be added to the report containing bar graphs for the TV, radio, and print marketing activities. In section 1250 for the TV marketing activity contains bar 1252 for the current percentage allocation to national TV, bar 1253 for the current percentage allocation to cable TV, bar 1257 for the ideal percentage allocation to national TV, and bar 1258 for the ideal percentage allocation for cable TV. The other report sections are similar.

FIGS. 13-18 describe the process by which the facility determines the activity distribution shown in FIG. 12. FIG. 13 is a process diagram that describes collecting additional offering attribute information from the user. In some embodiments, this additional attribute information is obtained from the user using a user interface that is similar in design to that shown in FIGS. 6-9. FIG. 13 shows a number of attributes 1300 for which values are solicited from the user for the subject offering.

Figure 14:
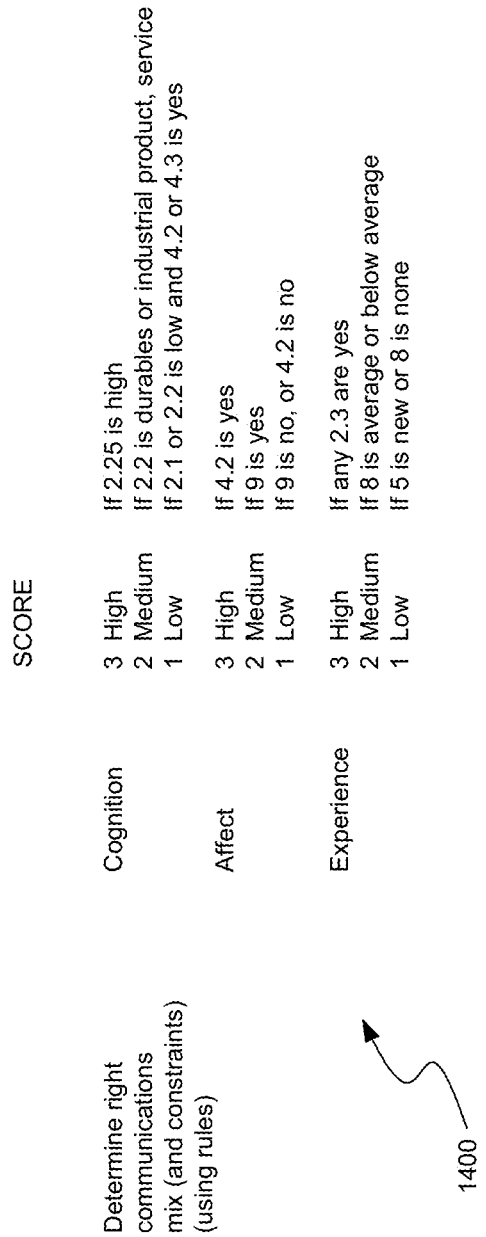
FIG. 14 is a process diagram showing the derivation of three derived measures for the subject offering: cognition, affect, and experience.

FIG. 14 is a process diagram showing the derivation of three derived measures for the subject offering: cognition, affect, and experience. The values for these derived measures are derived based upon the value of attributes shown in FIG. 13 provided by the user for the subject offering.

FIG. 15 is a table diagram showing sets of marketing activity allocations, each for a different combination of the three derived attributes shown in FIG. 14. For example, FIG. 15 indicates that, for subject offerings assigned a high cognition score and medium affects score should be assigned marketing resources in the following percentages: TV 44%, print magazines 12%, print newspapers 0%, radio 5%, outdoor 0%, internet search 10%, internet ad words 5%, direct marketing 12%, sponsorships/events 7%, PR/other 5%, and street 0%. Each of these nine groups of allocations is based on the relative activity elasticities, like those shown in FIG. 3, grouped by the cognition and affect scores indicated for the groups of historical marketing efforts contained in the library.

Figure 16:
FIG. 16 is a process diagram showing how the initial allocation specified by the table in FIG. 15 should be adjusted for a number of special conditions 1600.

FIG. 16 is a process diagram showing how the initial allocation specified by the table in FIG. 15 should be adjusted for a number of special conditions 1600.

FIG. 17 is a process diagram showing how the facility determines dollar amount for spending on each marketing activity. The process 1700 takes the size of target audience specified by the user and divides by affective percentage of target to obtain a purchased reach—that is, the number of users to whom marketing messages will be presented. This number is multiplied by the adjusted allocation percentage to obtain a frequency per customer which is then multiplied by a number of purchase cycles per year and cost per impression to obtain estimated spending for each activity.

Figure 18:
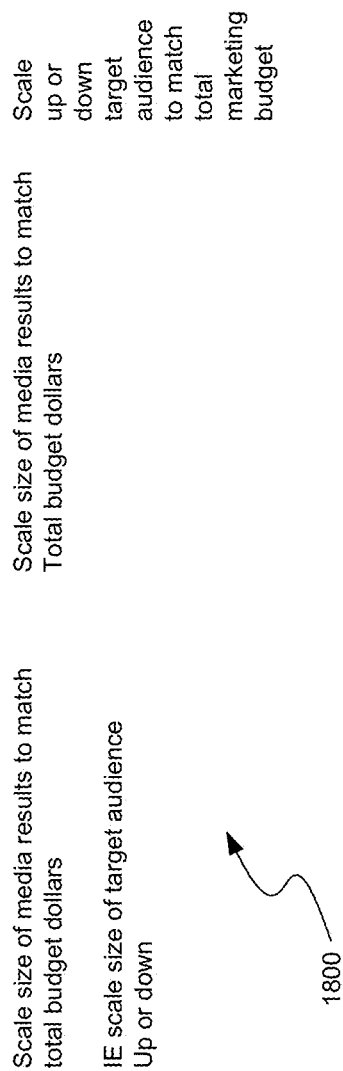
FIG. 18 is a process diagram showing the final adjustment to the results shown in FIG. 17.

FIG. 18 is a process diagram showing the final adjustment to the results shown in FIG. 17. Process 1800 specifies scaling the target audience up or down to match the total marketing budget determined by the facility for the subject offering.

Figure 19:
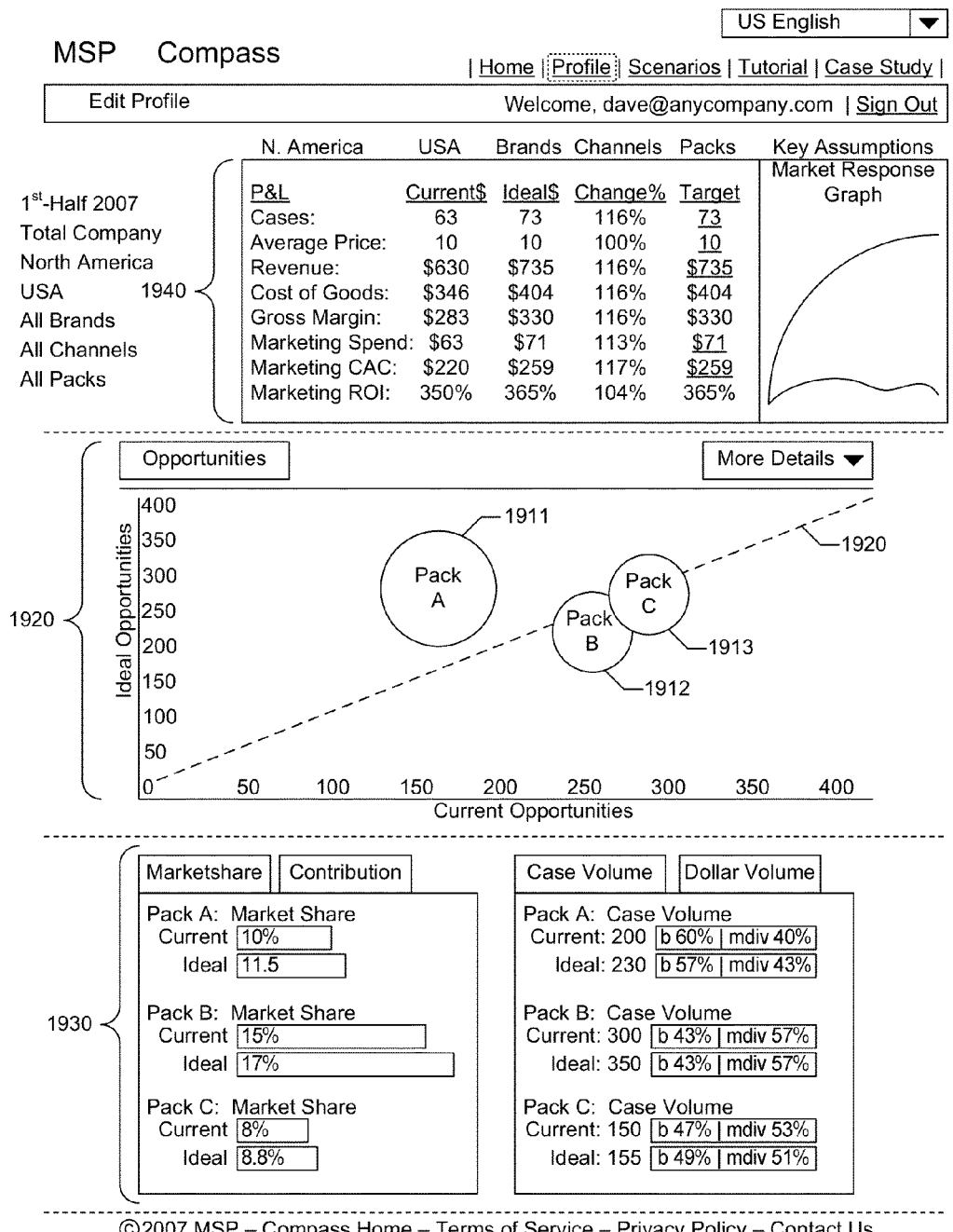
FIG. 19 is a display diagram showing a display presented by the facility to portray resource allocation prescriptions made by the facility with respect to a number of related subject offerings, such as the same product packaged in three different forms.

FIG. 19 is a display diagram showing a display presented by the facility to portray resource allocation prescriptions made by the facility with respect to a number of related subject offerings, such as the same product packaged in three different forms. The display includes a chart 1910 that graphically depicts each of the related subject offerings, pack A, pack B, and pack C, each with a circle. The position of the center of the circle indicates the current and ideal total marketing budget allocated to the offering, such that each circle's distance and direction from a 45° line 1920 indicates whether marketing spending should be increased or decreased for the offering and by how much. For example, the fact that the circle 1911 for pack A is above and to the left of the 45° line indicates that marketing spending should be increased for pack A. Further, the diameter and/or area of each circle reflects the total profit attributable to the corresponding subject offering assuming that the ideal total marketing budget specified by the facility for that offering is adopted. The display also includes a section 1930 containing a bar graph showing market share and volume, both current and ideal, for each related subject offering. The display also includes a section 1940 showing information similar to that shown in Section 1150 of FIG. 11.

In some embodiments, the facility considers data received from one or more of a number of types of external sources, including the following: syndicated media, syndicated sales data, internet media, internet behavioral data, natural search query data, paid search activity data, media data like television, radio, print, consumer behavioral data, tracking survey data, economic data, weather data, financial data like stock market, competitive marketing spend data, and online and offline sales data.

In various embodiments, the facility incorporates one or more of the following additional aspects, discussed in greater detail below:

1) Minimum Distance Matching of communication touchpoints to brand/client needs;
2) A classification method for communication needs (cognition, affect and experience);
3) The interactions of traditional media and internet media, as well as experience factors;
4) The joint optimization of core media, internet media and experience factors
5) The combination of user-specific multi-source data (USMSD) for outcomes and driver variables necessary for the computations;
6) The intelligent automation of the data stack for modeling;
7) The intelligent automation of model specifications, statistical estimation and expert knowledge;
8) The use of dynamic, real time internet "native" search data as predictive, momentum (DNM) indicators of marketing and brand response.
9) Measurement of the dynamic interactions, optimization, forecasting and prediction of outcomes using marketing drivers, brand momentum and marketing ROI
10) Reporting of brand/client results 1) Minimum Distance Matching (1.1) Using the input questions for Information (Qx), Affect (Qy) and Experience (Qz), the facility classifies the brand/client communication needs using these 3 dimensions and a 3 point scale of low, medium and high (coded numerically as 1, 2, 3).

(1.2) The facility can allocate resources over any of a large number of communication touchpoints, also known as communication channels. For each channel, the facility considers the capability of the "medium" to deliver information, affect and experience dimensions of brand/client communications.

In selecting communication channels, the facility minimizes the "distance" between the communication needs and the mediums/channels to then select touchpoints that are relevant for market response and subsequent application of the elasticities and ideal economics computations.

Distance is defined as the sum of squared differences (SSD) between the brand/client need and the medium/channel.

$$\text{Distance} = (\text{Medium Cognition} - \text{Brand Cognition})^2 + (\text{Medium Affect} - \text{Brand Affect})^2 + (\text{Medium Experience} - \text{Brand Experience})^2$$

$\hat{\ }$ denotes exponentiation

2) Method of Classification

The method of classification is described in paragraphs 1.1 and 1.2 above.

3) The Method of Interaction Between Traditional Media and Internet Media

The core outcome equation is defined (elsewhere) as $$\text{Outcomes} = (\text{Base Outcome}) * ((\text{Resource 1})^{\text{Elasticity 1}}) * ((\text{Resource 2}^{\text{Elasticity 2}}) \text{ etc.}$$

Additional resources multiply the right hand side.

The facility combines traditional media in Equation 3 as the so-called "direct path" linking resources and outcomes.

The facility extends this model to include the internet in 2 ways:

Method 3.1 is to add and include internet metrics for online display and paid search in conjunction with traditional media (TV, Print, Radio, etc.).

Method 3.2 is to also add and include one or more variables/metrics for internet "natural" search (VINS). An example of natural search is count data on words used in internet search boxes (as distinguished from impressions and clicks).

The facility then adds and applies a $2^{nd}$ "indirect path" equation whereby internet natural search is explained by traditional marketing and sales resources.

$$\text{Marketing Outcome} = F(\text{traditional resources, internet resources, natural search, base})$$

$$\text{Natural Search} = F(\text{traditional resources, internet resources, base})$$

These 2 equations work "recursively".

Practically, marketing and sales resources drive consumer/market attention and discovery. The discovery behavior is measured by the natural search. Subsequently in the recursive process, internet resources then "convert" attention into action.

4) Joint Optimization

The direct and indirect path equations then provide the mechanics for the "topline" of the economics optimization.

The facility applies varying resource input levels, flows the outcomes through the recursive topline equations to yield outcomes and then applies the associated elasticities (for diminishing returns) and the associated margins and costs of resources.

Also, in some cases the facility extends this method with a $3^{rd}$ equation whereby Paid Search also is handled comparably to natural search. Hence, Paid Search is an intermediate outcome.

Any dynamic, momentum, intermediate or interim brand metric (awareness, consideration, buzz) is handled using this $3^{rd}$ equation method.

5) User-Specific Multi-Source Data (USMSD)

The demand/outcome equations require data inputs that are:

Brand specific;
External industry specific;
Data for Marketing and Sales resources; and
Internet specific data related to the brand/user/client The facility is unique in bringing together these 4 data streams for the purposes of demand modeling using the 2 equation method outlined above.

5.1) Brand data typically includes volumetric sales, pricing, revenue, new customer counts, existing customer counts, customer retention, customer attrition and customer upsell/cross sell of products or services. It also includes industry and brand/client attributes from the input questions.

5.2) External data includes a series of external factors and drivers. Typically, these include elements describing economic conditions and trends as well as weather, competitors marketing and sales resources and others.

5.3) Marketing and Sales data includes various measures for resource inputs. These can include resource spending for communication mediums/touchpoints. They can include physical measures of resources for mediums/touchpoints (time-based, ratings points or physical units such as direct mail counts etc).

5.4) The Internet specific data includes mainly measures of natural search using word counts and counts of word clusters and semantic phrases. Typically, these word measures address the brand name itself, aspects of the key phrasing associated with the brand (the so-called universal selling proposition), aspects of the brand positioning such as Quality and more generic or generalized words associated with the brand.

Figure 20:
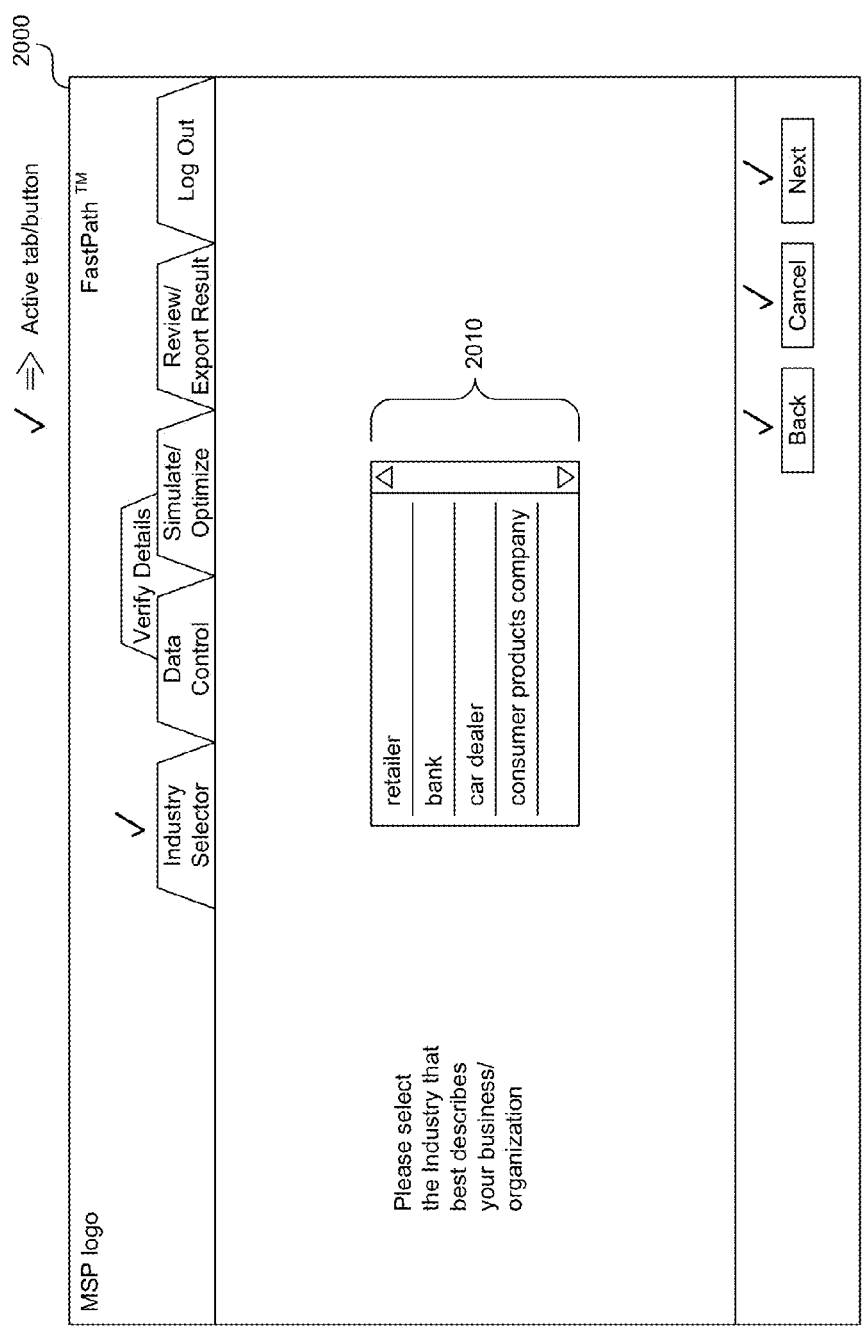
FIGS. 20-23 are display diagrams showing a typical user interface presented by the facility in some embodiments for specifying and automatically collecting data inputs.

FIGS. 20-23 are display diagrams showing a typical user interface presented by the facility in some embodiments for specifying and automatically collecting some or all of these data inputs. FIG. 20 shows an initial display containing a list of business categories, from which the user selects the most appropriate category.

Figure 21:
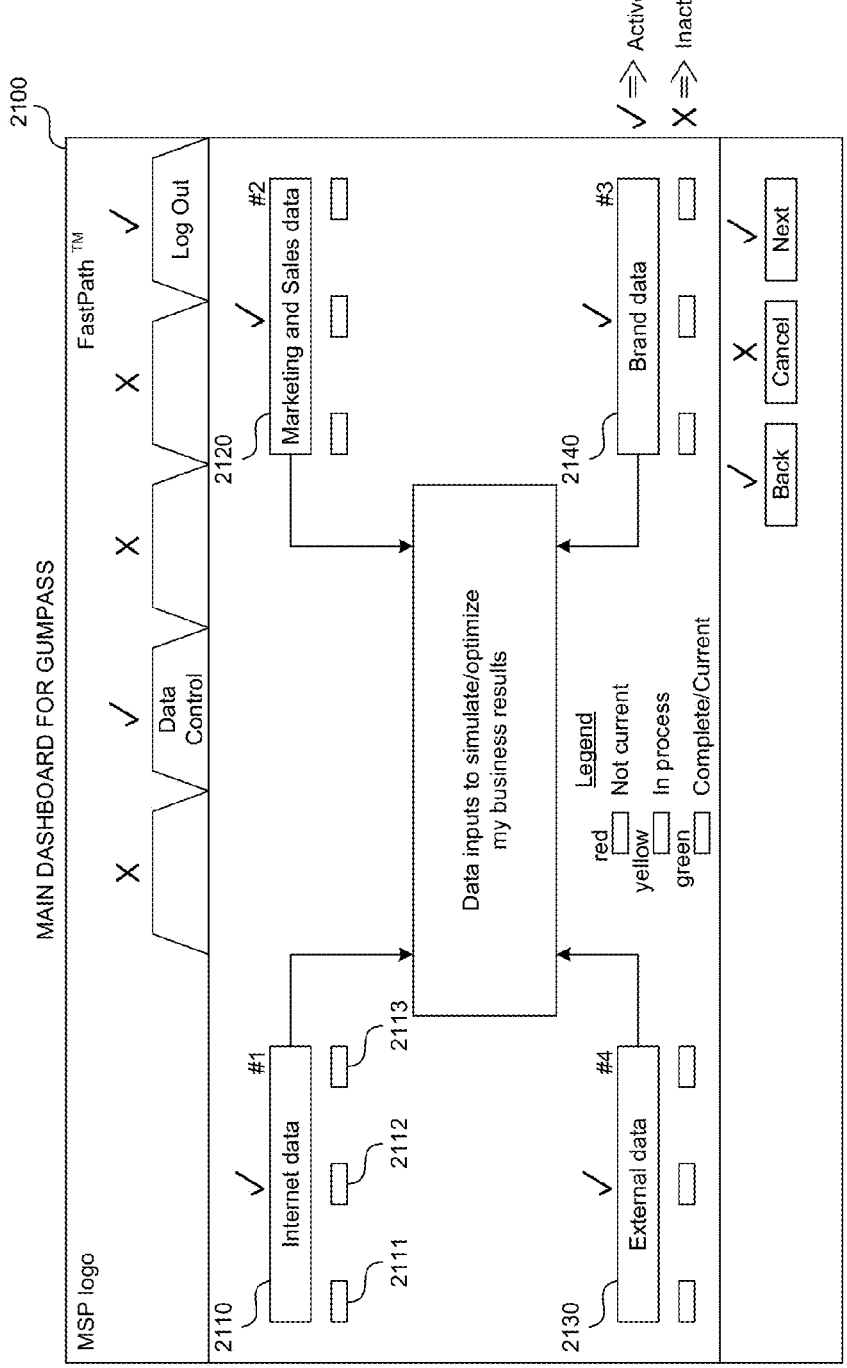

FIG. 21 shows a dashboard indicating the data retrieval status for the four categories of data inputs 2110, 2120, 2130, and 2140. Each type has status indicators—e.g., status indicators 2111-2113 for internet data category 2110—to indicate the retrieval status of data in this category. Additionally, the user can click on any of the data types to view detailed information about data of that type.

Figure 22:
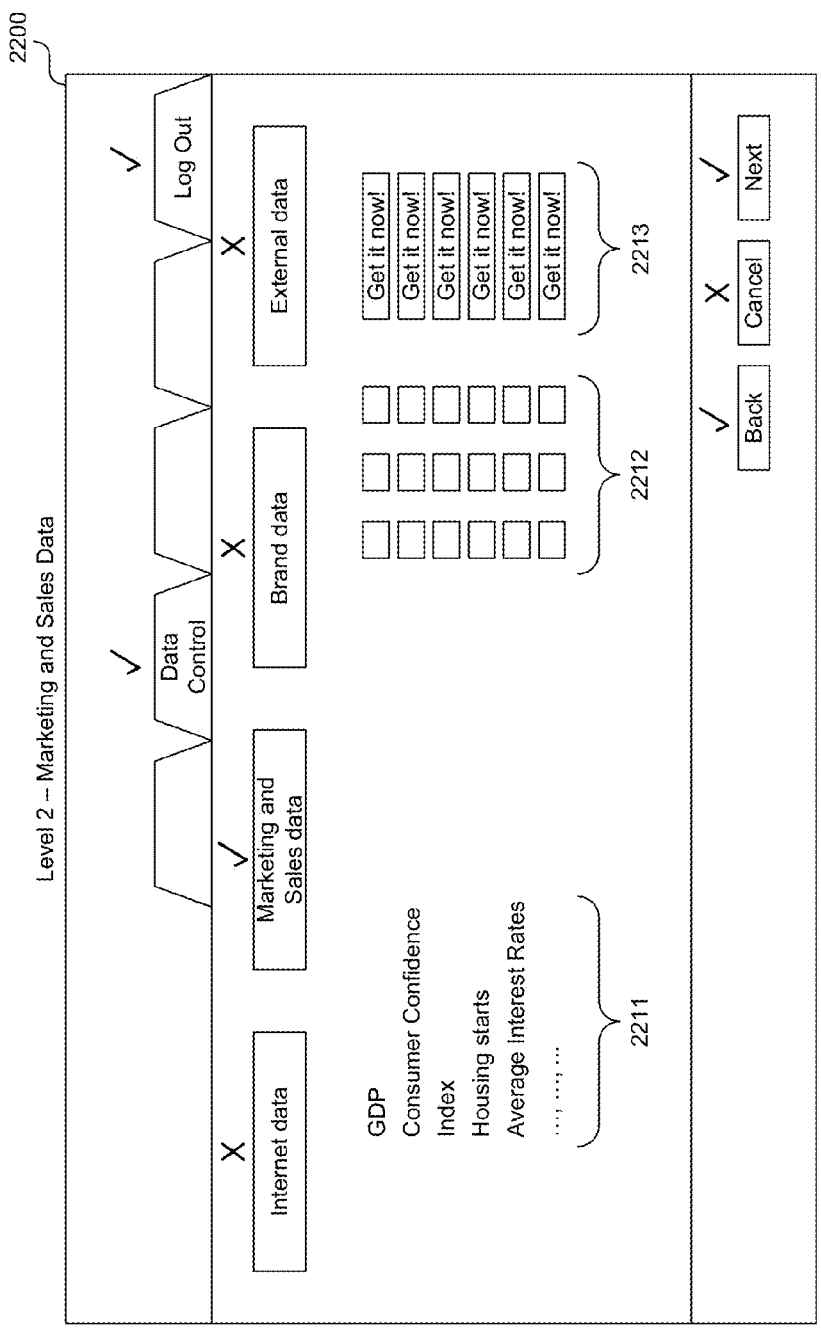

FIG. 22 shows a detailed display for data in the marketing and sales data category. This display 2200 shows a number of different components 2211 of the marketing and sales data category; status indicators 2212 indicating the retrieval status of each of the components, and controls 2213 that the user may operate to initiate retrieval of each component.

Figure 23:
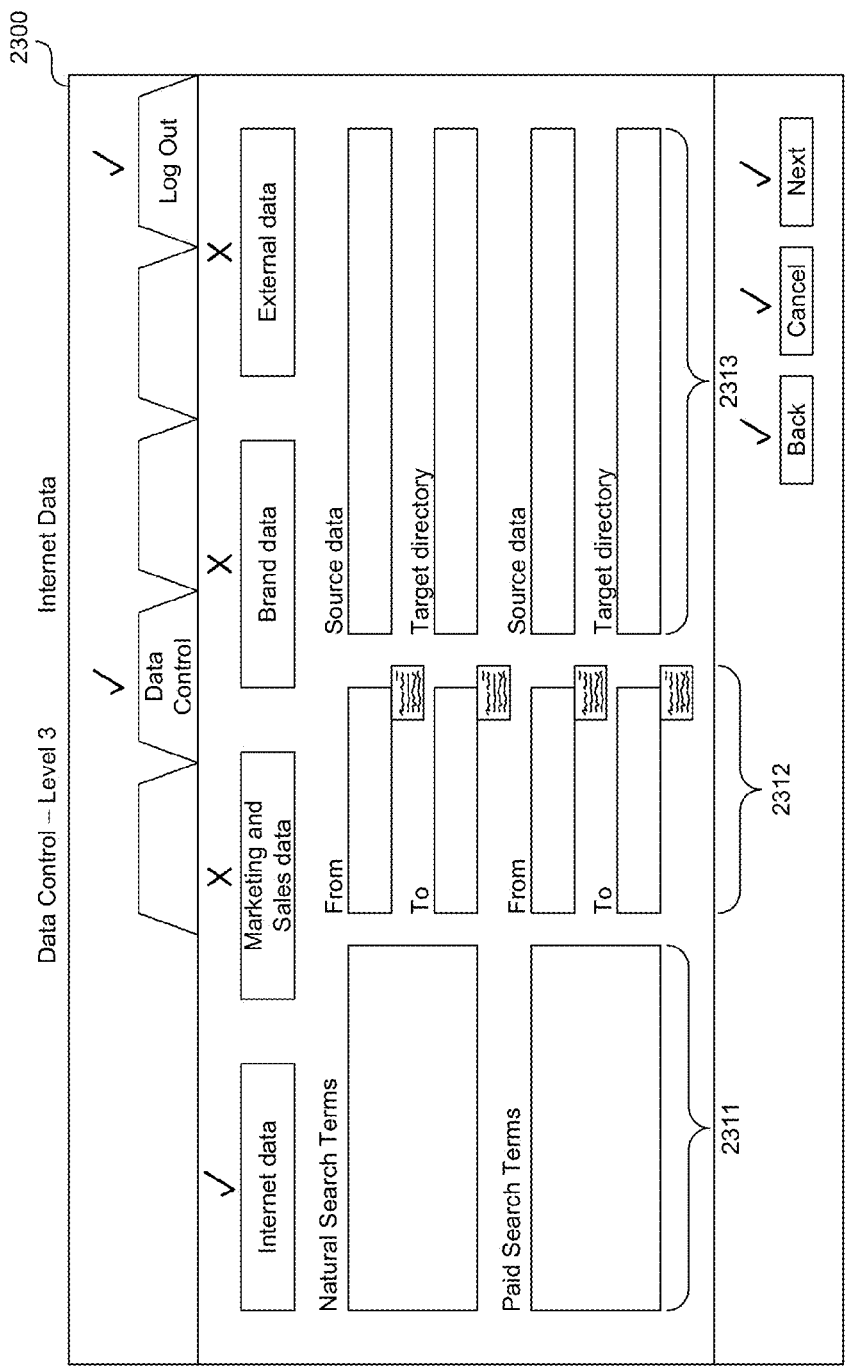

FIG. 23 shows a display. The display includes controls 2311 for entering natural search terms and paid search terms that are relevant to the offering; controls 2312 for specifying relevant time periods for each natural search and paid search; and controls 2313 for specifying where frequency data for a natural search and paid search is retrieved from and stored.

6) Intelligent Data Stack

The facility uses the data dashboard user interface shown in FIGS. 20-23 to allow users to select the appropriate set of outcome and driver data, as well as financial factors to be used by the facility.

The facility then provides a data input template for each data class (see 5.1, 5.2, 5.3, 5.4 above).

The facility then applies a set of quality and data scrubbing algorithms to verify for the user the overall completeness, consistency and accuracy of the designated data streams.

The facility then transforms and loads these data vectors into the overall the facility matrix for modeling (MOM).

The row structure for MOM typically involves time dimensions, customer segments, channels of trading and/or geographic layers.

The column structure for MOM typically involves final outcome variables, intermediate outcome variables and driver variables (see 5.1, 5.2, 5.3 and 5.4).

The facility uses a so-called log/log transformation for the data and the demand model specification.

$$Ln(Outcome)=Constant+Coef1*ln(Driver1)+Coef2*ln(Driver2)+Coef3*ln(Driver 3), etc.$$

The facility applies generalized least squares (GLS) methods for the statistical estimation of the various equations.

The facility also constructs any necessary "dummy" variables used in the econometrics, including seasonality.

7) Intelligent Estimation

The facility includes linkage and comparative methods across the Candidate Models (CM), the statistical diagnostics, t-values and GLS estimates of model/equation coefficients.

The facility conducts GLS estimation of approximately 40 CM variants and associated diagnostics. (The facility includes the numerical algorithms and methods for GLS.)

The facility then selects and utilizes the BLUS (best, linear, unbiased estimates) of response coefficients (response elasticities) for economic optimization for resource levels and mix.

This selection is determined by best fit, best t-values, the absence of multi-collinearity, the absence of serial correlation and elasticity estimates which are consistent with the Expert Library (CEL) and proper numerical signs (positive, negative).

8) Dynamic Native Momentum (DNM)

As described above, the word counts and word count clusters related and derived from internet natural search include and address concepts for brand momentum, brand quality and brand image.

The facility classifies these word/semantic concepts into driver variables which are relevant and used within the 2 equation direct path and indirect path equations (see above). These semantic "buckets" include counts of received queries, related to the brand name itself, counts related to the product or service category and the brand/clients competitors and counts related to more generalized themes (for example, hybrid technology vehicles vs. Lexus RXH).

The facility includes dynamic feeds of word counts from natural search from search providers such as Google, Yahoo or MSN or others (MySpaces, Facebook, YouTube) as well as wireless and mobile devices.

DNM data are typically a dynamic sample of on-going internet traffic. The facility uses counts per "x" million queries.

9) Dynamic Use of Internet Momentum in Optimization, Prediction and Forecasting

The facility uses the 2 equation method outlined above to construct top-down optimization of brand/client goals relative to resource drivers. Drivers here include both traditional marketing and sales, as well as pricing and internet resources.

The facility uses both direct computation (closed form calculus) and a branch and bound (B&B) heuristic method to compute ideal outcomes using the domain of resource drivers.

10) The Facility Reporting of Brand/Client Outcomes and Results

The facility includes visual reporting and GUIs for brand/client outcomes (see Compass SMB, Compass Agency and Compass USMSD/DNM herein.) For example, in various embodiments, the facility displays outcomes using one or more of a sales response curve, a profit curve, and a current vs. ideal bar graph.

In various embodiments, the facility allocates resources across some or all of these channels, and in some cases additional channels:
Television
Movie theatre
Radio
Newspapers
Magazines
Print articles
Customer magazines
Loose inserts
Internet advertising
Internet search
Brand/company websites
Emails
Outdoor
Home shopping TV
Product placement
Airport
Public transportation
Sponsorship of sports events
Sponsorship of other events
Doctor's office
800/toll free lines
Mailings at home
Celebrity endorsement
In-store advertising
In-store examination
Promotions and special offers
Product samples
Recommendations from friends and family
Recommendations from professionals
Video on demand
Video games
Streaming video
Interactive TV
Spec text table
"ACE" Adjusted, Multi-Source Market Response Elasticity Library Market response optimization (MRO) typically requires best, linear, unbiased estimates (BLUS) of resource response elasticity parameters which are based on data which embodies (1) adequate variation in resource levels and mix, as well as (2) adequate data observations.

In some embodiments, the facility uses a 4-step method for computing BLUS estimates of elasticity using cross-brand and cross-resource $3^{rd}$ Party data. In particular, in some embodiments, the facility retrieves outcome and driver data from each of a number of third-party sources, using a pre-defined template for each source to guide the retrieval and mapping of this third-party data. The 4-step method uses of ACE-L meta-data in combination with $3^{rd}$ Party data on outcomes and drivers that is consistent across clients—despite differences in data collection and reporting processes that might be followed by different clients—in further combination with the best statistical methods for BLUS.

The value and result is a comprehensive database of cross-brand, cross media elasticities which is used for resource optimization. This overall methodology allows and measures (1) the pure effect of resource spending on sales outcomes across a wide range of cross brand and cross resource conditions and (2) the impacts of alternative ways to define "content impacts" via the ACE-L scores.

In some embodiments, the facility uses the retrieved third-party data together with client-specific data about sales or one or more other business outcomes that is obtained from the client in order to generate recommended resource allocations for the client. In some cases, this can obviate the need to collect outcome and/or driver data from the client, often saving significant time and resources.

Multi-Source Data

There are 2 main classes of data for modeling—outcomes and drivers. For econometric modeling, the ACE method typically utilizes combined time-series and cross-section data.

For the Multi-Source Library (MSL) and outcomes (dependent variables), ACE uses a consistent definition of sales revenue for the brands/services in the library.

For the Multi-Source Library (MSL) and resource drivers, ACE uses a range of independent variables.

Step 1: The facility obtains data for these drivers from $3^{rd}$ Party data providers. For example, data series on media spending by time period, market location and type of media can be obtained from 1 or more $3^{rd}$ Party sources. Data classes include the economy, competition, tracking, pricing, channel funds, salesforce, retail store conditions, offline marketing and online marketing as well as certain momentum data.

Typically, these $3^{rd}$ Party data sources (3PDS) have known or well understood differences relative to client-specific transactional data (errors in variables, see below). However, these differences are generally thought to be consistent.

The cross-sections in the Multi-Source Library consist of brands/services, geographies and more. We apply the 3PDS resource drivers, defined consistently, within and across the library data for the brands, etc. Effectively, the facility eliminates data variation due to differences in data definitions across brands/clients.

ACE Adjusted, Dynamic Parameters the basic method is to define Sales=Base Volume times (Marketing Resource) ^Elasticity Parameter, where ^ denotes the natural exponent.

$$Sales=(Base)*(Resource)\hat{\ }(Delta)$$

For each brand (i.e. data record), the facility defines its ACE scores on a 1-5 scale—for Affect (A), Cognition (C) and Experience (E). Also, in some embodiments, the facility adds one factor for Local Market or Time Sensitivity (L).

Step 2: The facility then extends the modeling using the following specification for determining elasticity with respect to the combination of a single brand and a single marketing medium:

$$\text{Elasticity Parameter(Delta)}=(c0+c1*\text{Affect}+ \\ c2*\text{Cognition}+c3*\text{Experience}+c4*\text{Local}).$$

The coefficient $c0$-$c4$ are determined using a least-squares regression analysis. Each record (cross-section) in the Library uses and includes the ACE-L scores.

Practically, what this means is that up and down movement in the elasticity due to the brand characteristics, and the capacity of the media type to carry the content related to affect, cognition, and experience, is permitted.

For example, increasing the Affect score needed to motivate the consumer in turn will allow the elasticity of TV media to increase in this situation versus other brands with differing content goals. Lift factors for Print and Internet increase with information needs. Lift for Outdoor, Radio and Newspaper increase with the local market focus.

Complete BLUS Estimation of Response Elasticities

The basic or core elasticity parameters, absent ACE-L, use a formulation as follows:

Core Equation:

$$\text{Ln(Sales)}=d1*\text{Ln(Sales Prior Period)}+d2*\text{Ln(Base)}+ \\ \text{Delta}*\text{Ln(Resource)}+\text{Other}+\text{Error}$$

Each resource extends this formulation similarly. Other factors which drive "Delta" are described in Compass, including innovation.

Step 3: The facility substitutes forward the ACE adjustments into this Core Equation to replace Delta. The result are a series of direct effects and "interactions" with the ACE components, as additional drivers. As an example:

$$\text{Partial Component of Core Eq} = (C0*Ln(Resource) + C1*Affect*Ln(Resource) \text{ etc. etc.})$$

Proper estimation of these direct and interaction parameters requires that the data and formulation are consistent with certain rules.

One rule or assumption is that the error terms are independent and identically distributed (iid), albeit with similar variances.

However, due to the cross-section design, several aspects of the homogeneity assumptions will not be met.

This condition is known as heteroskedasticity.

Step 4: To correct for heteroskedasticity, the facility applies both Generalized Least Squares (GLS) estimation using Fixed Effects and corresponding "weights" for the cross-sections.

Other rules include correcting for serial correlation using lag terms, by including a business result, such as sales, from the previous period as an explanatory variable in the equation.

User Interface

In some embodiments, the facility presents a user interface for soliciting client input and presenting results as part of the ACE process. FIGS. 24-49 are display diagrams showing a typical user interface presented by the facility in connection with the ACE process.

Figure 24:
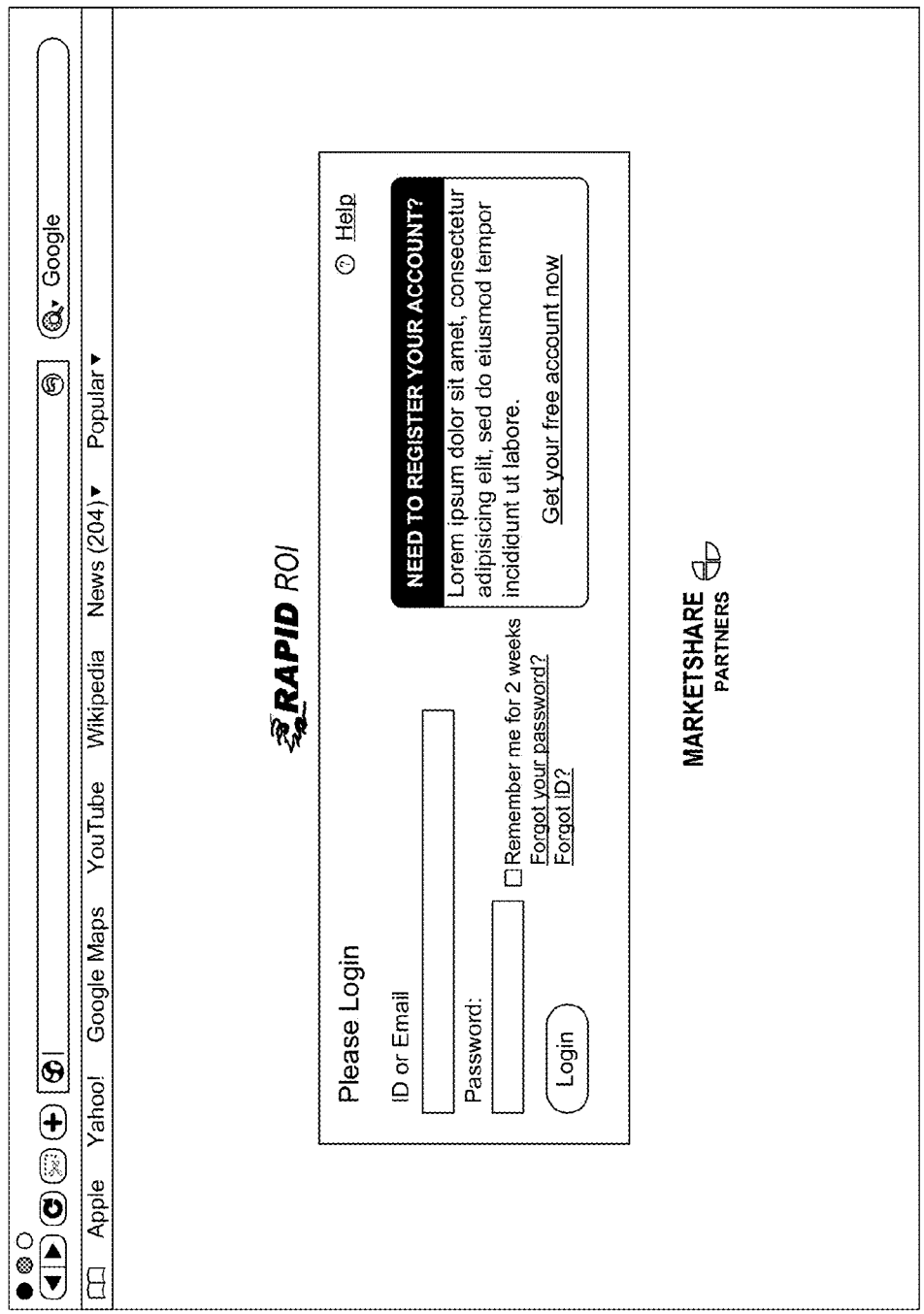

FIG. 24 is an account login screen used by the user to obtain access to their account.

Figure 25:
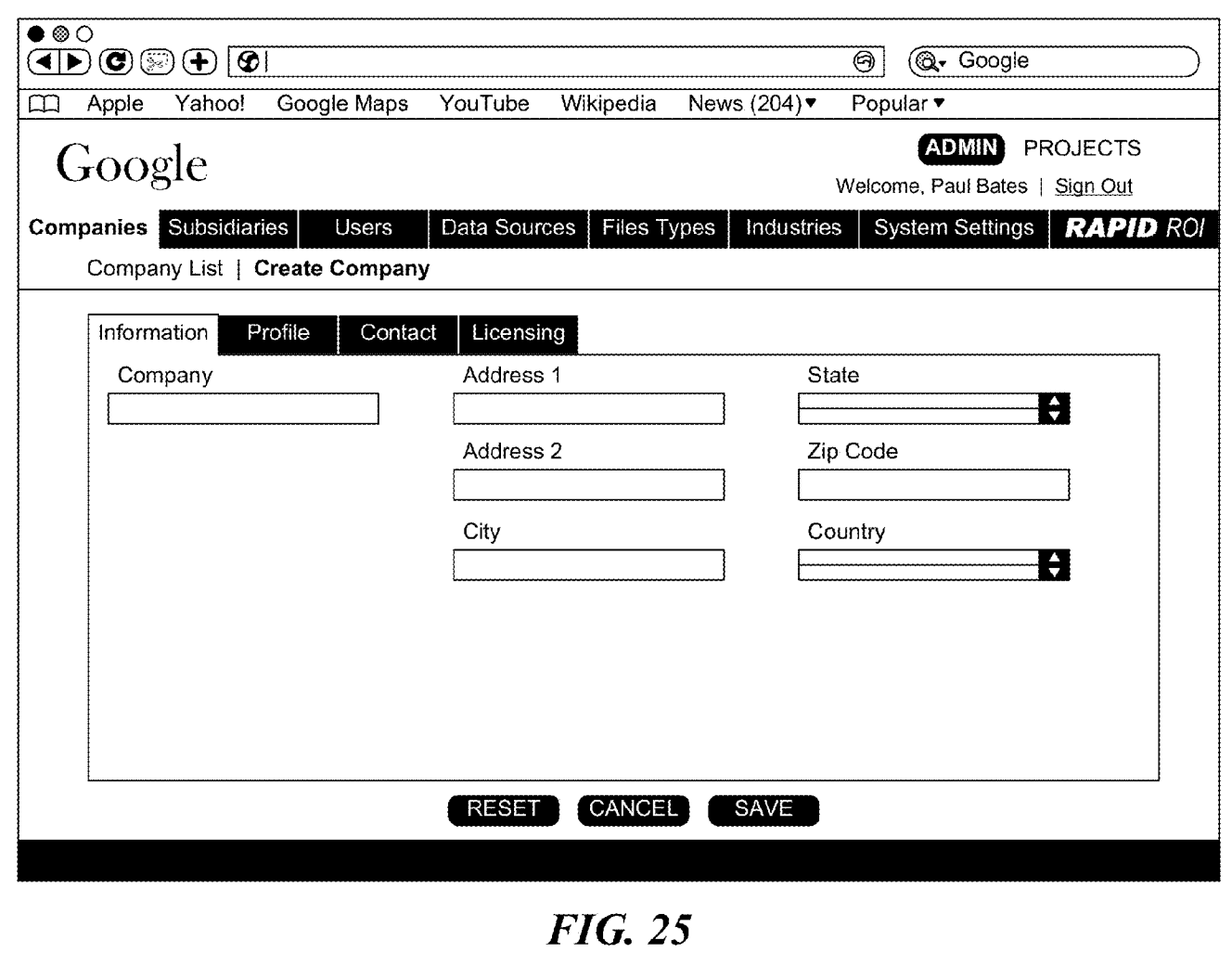

FIG. 25 shows a create company form for entering identifying information about a new client company.

Figure 26:
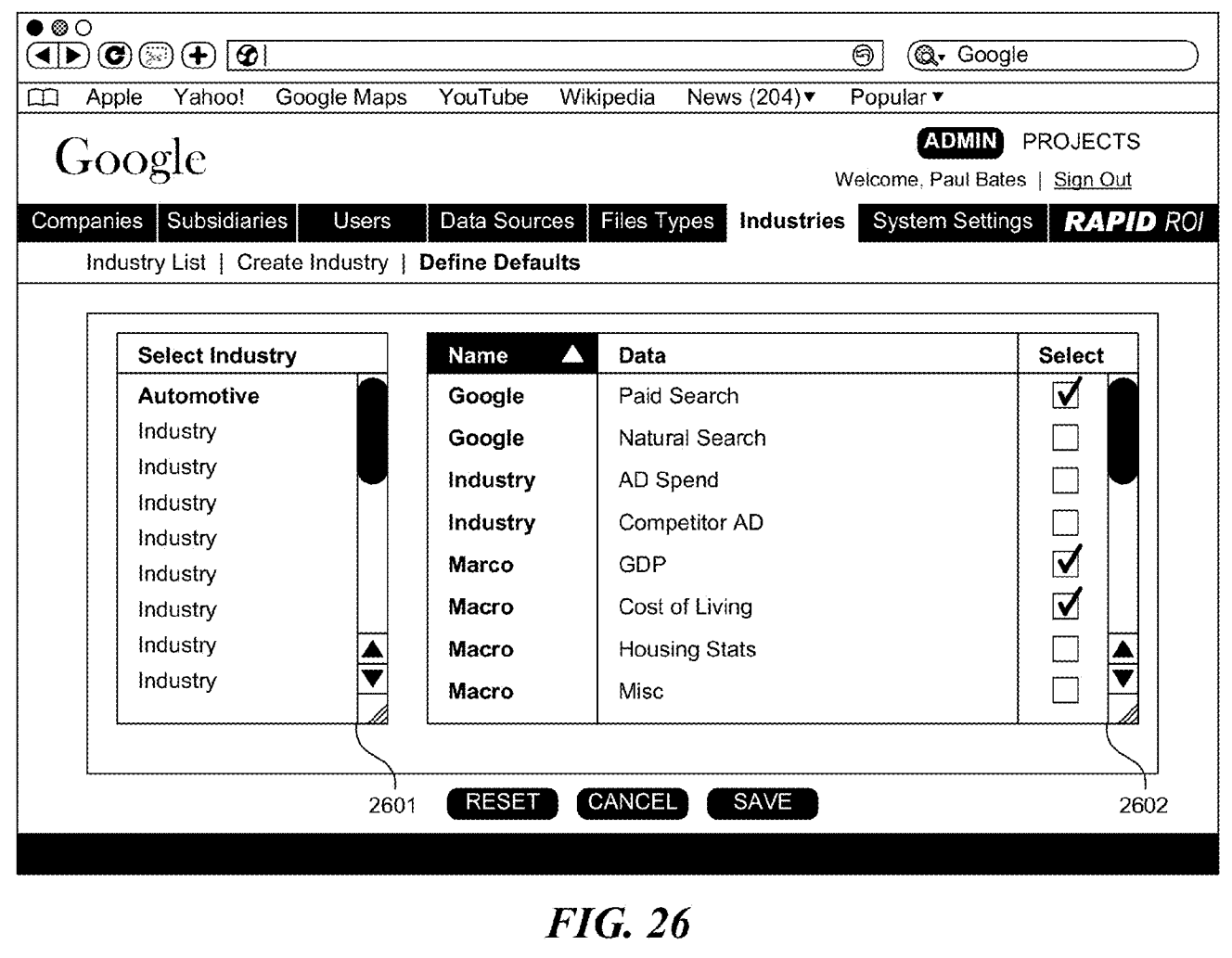

FIG. 26 contains controls 2601 for selecting the client's industry. FIG. 26 further includes controls 2602 for selecting from among various kinds of data available from different third-party sources to be used in the ACE analysis.

Figure 27:
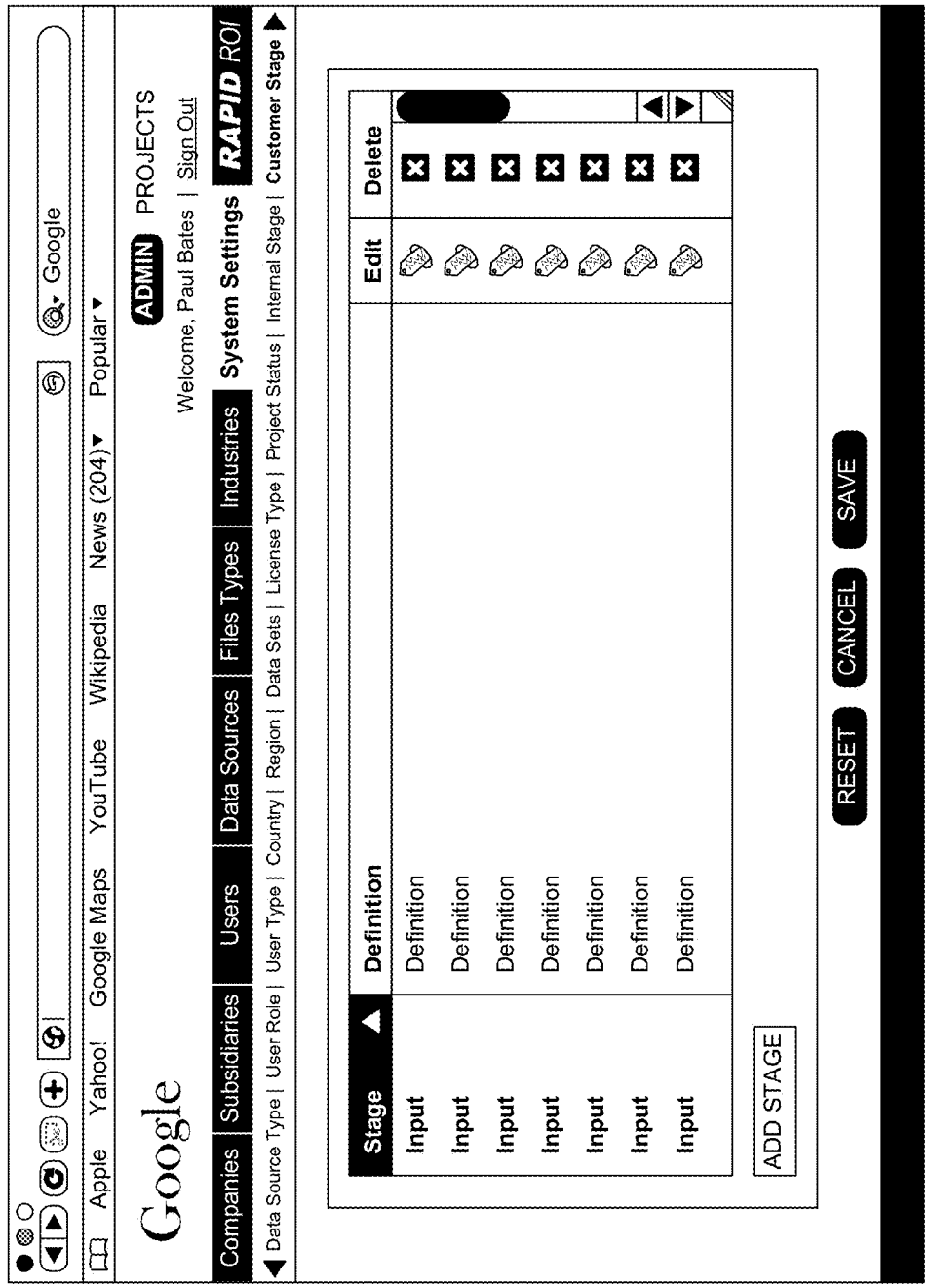
Figure 28:
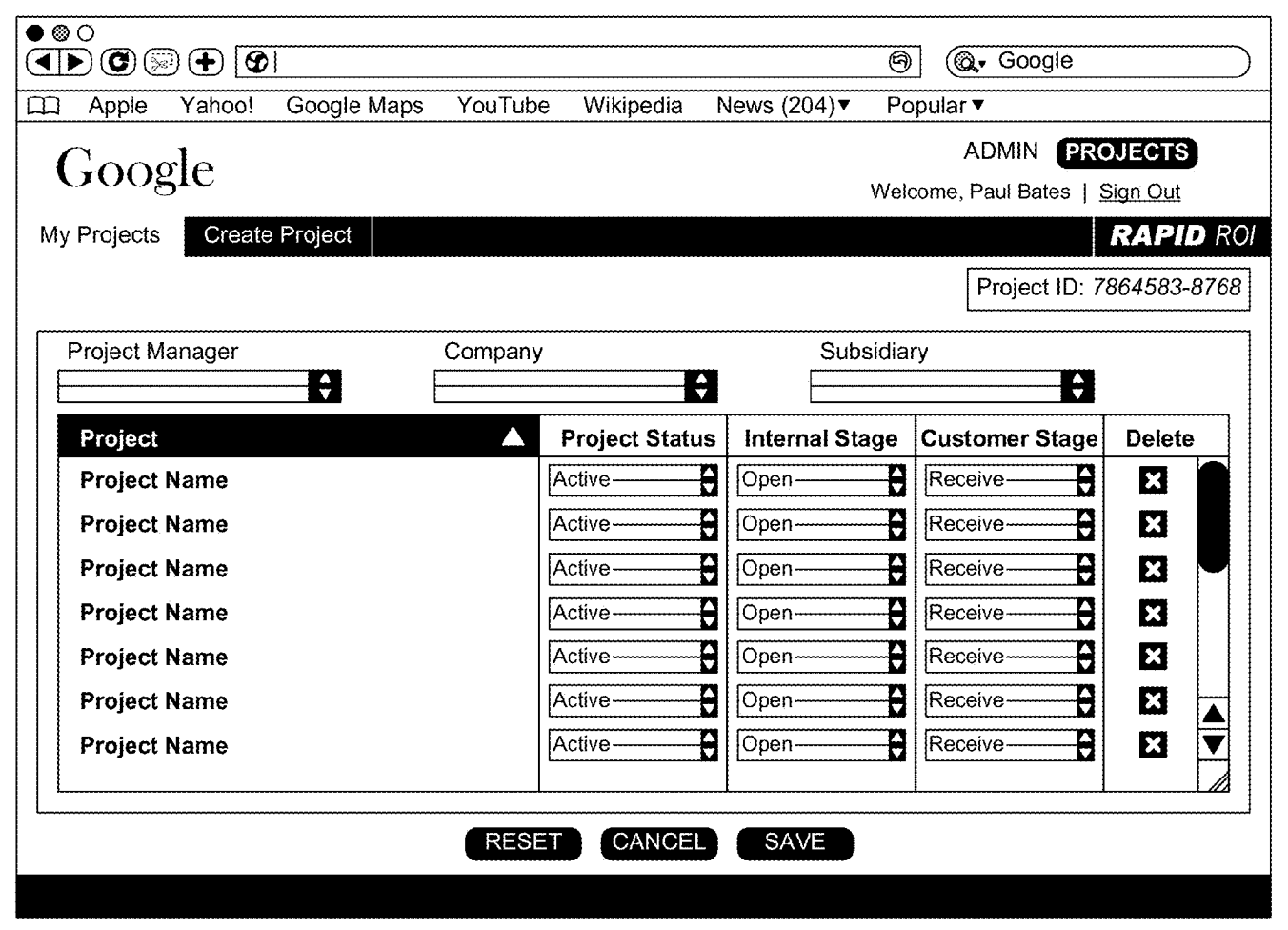
Figure 29:
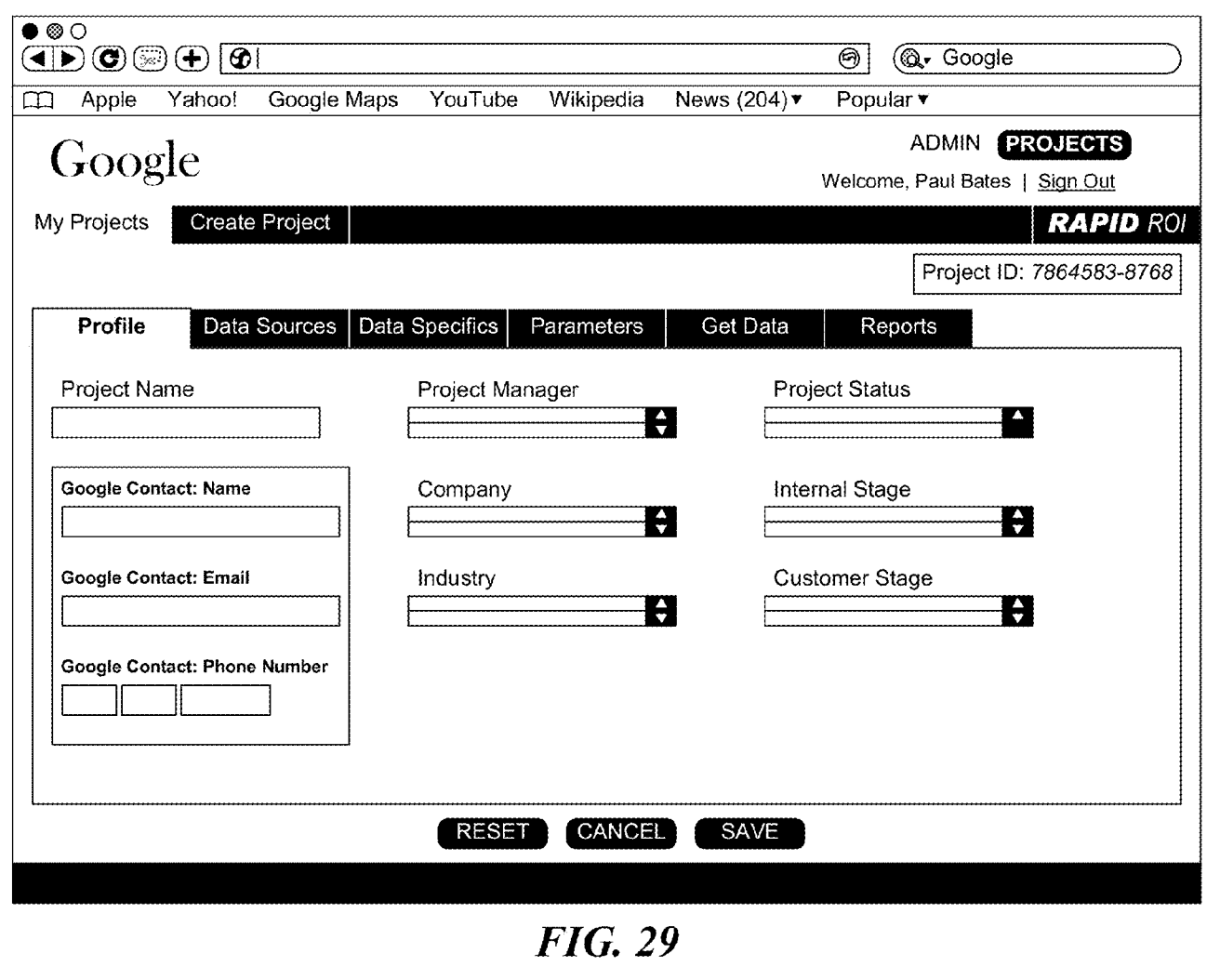

FIG. 27 includes controls for creating and defining a variety of stages for the ACE process. FIG. 28 contains controls for creating and defining one or more projects for the client. FIG. 29 contains controls for entering identifying data about a particular project.

Figure 30:
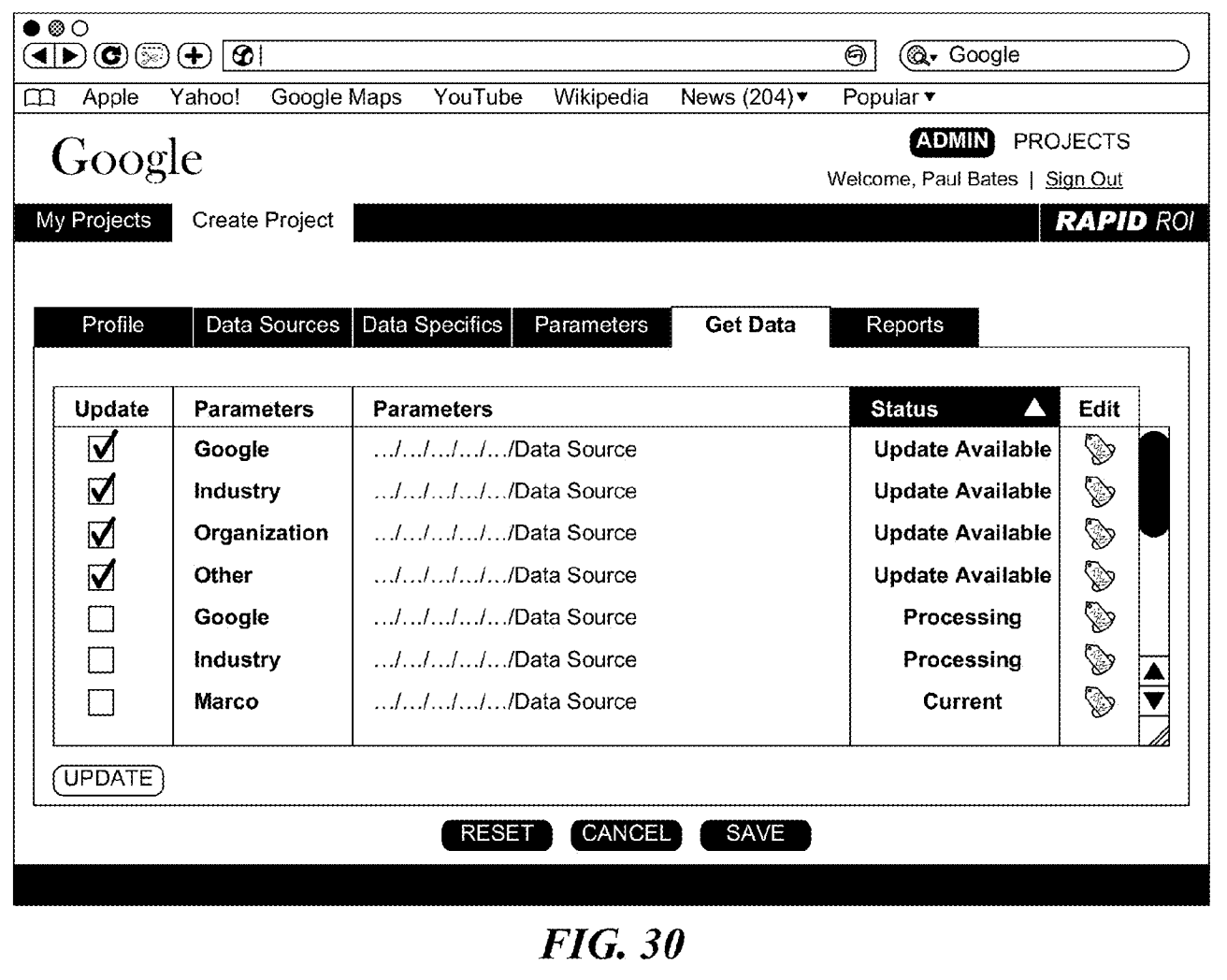

FIG. 30 shows controls usable to discern the status of data retrieval from different sources, as well as control data retrieval from various sources.

Figure 31:
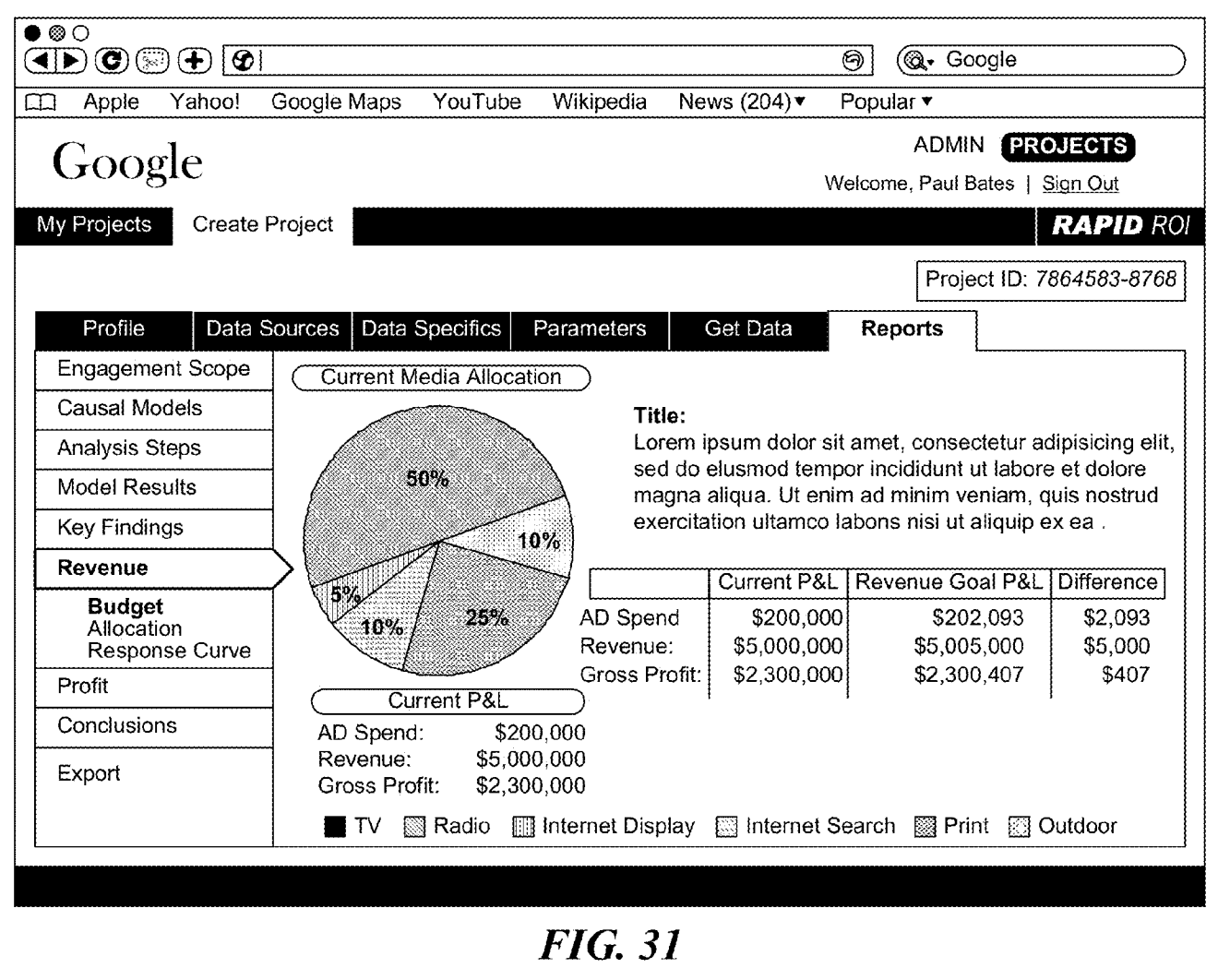
Figure 32:
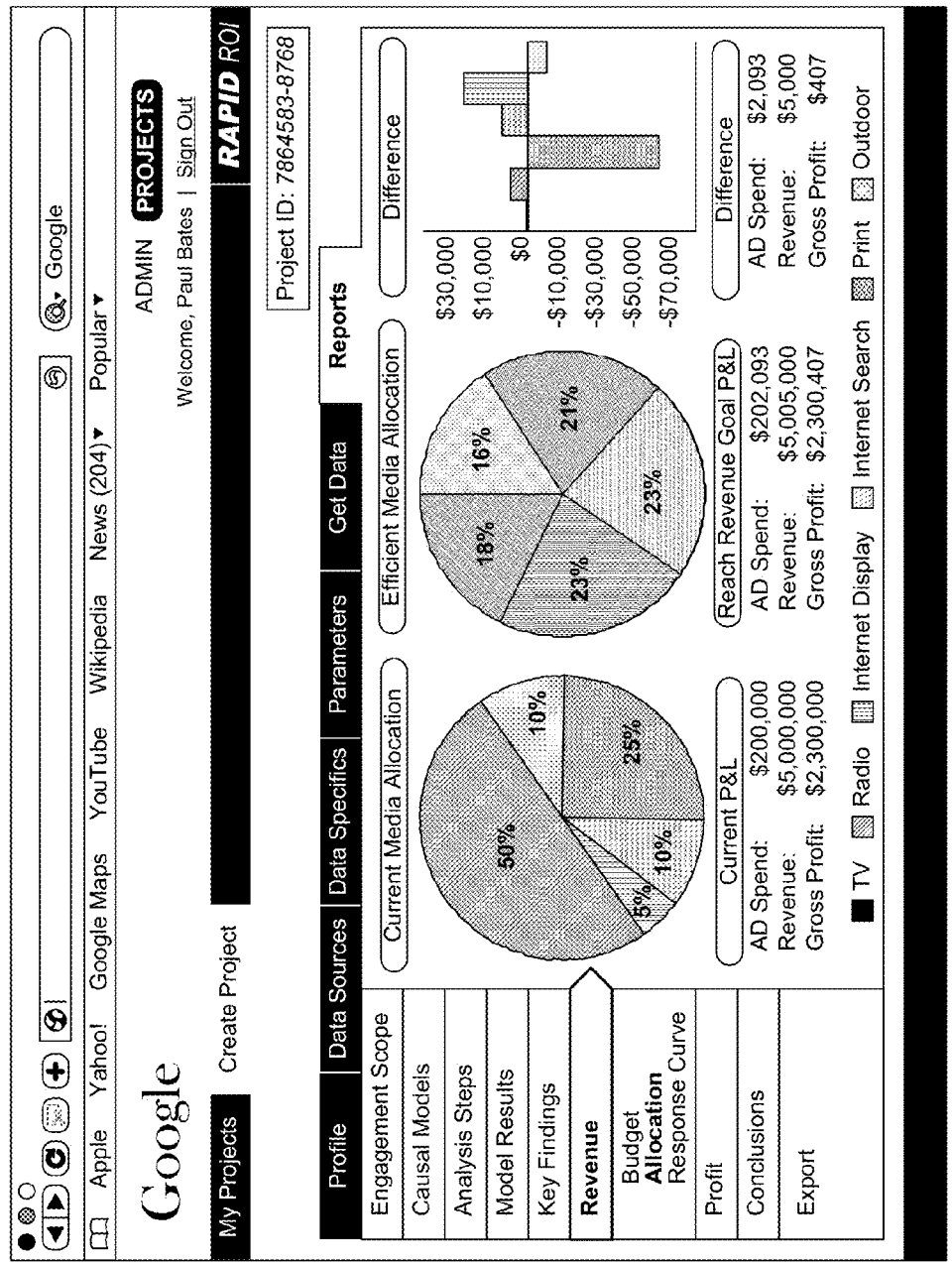
Figure 33:
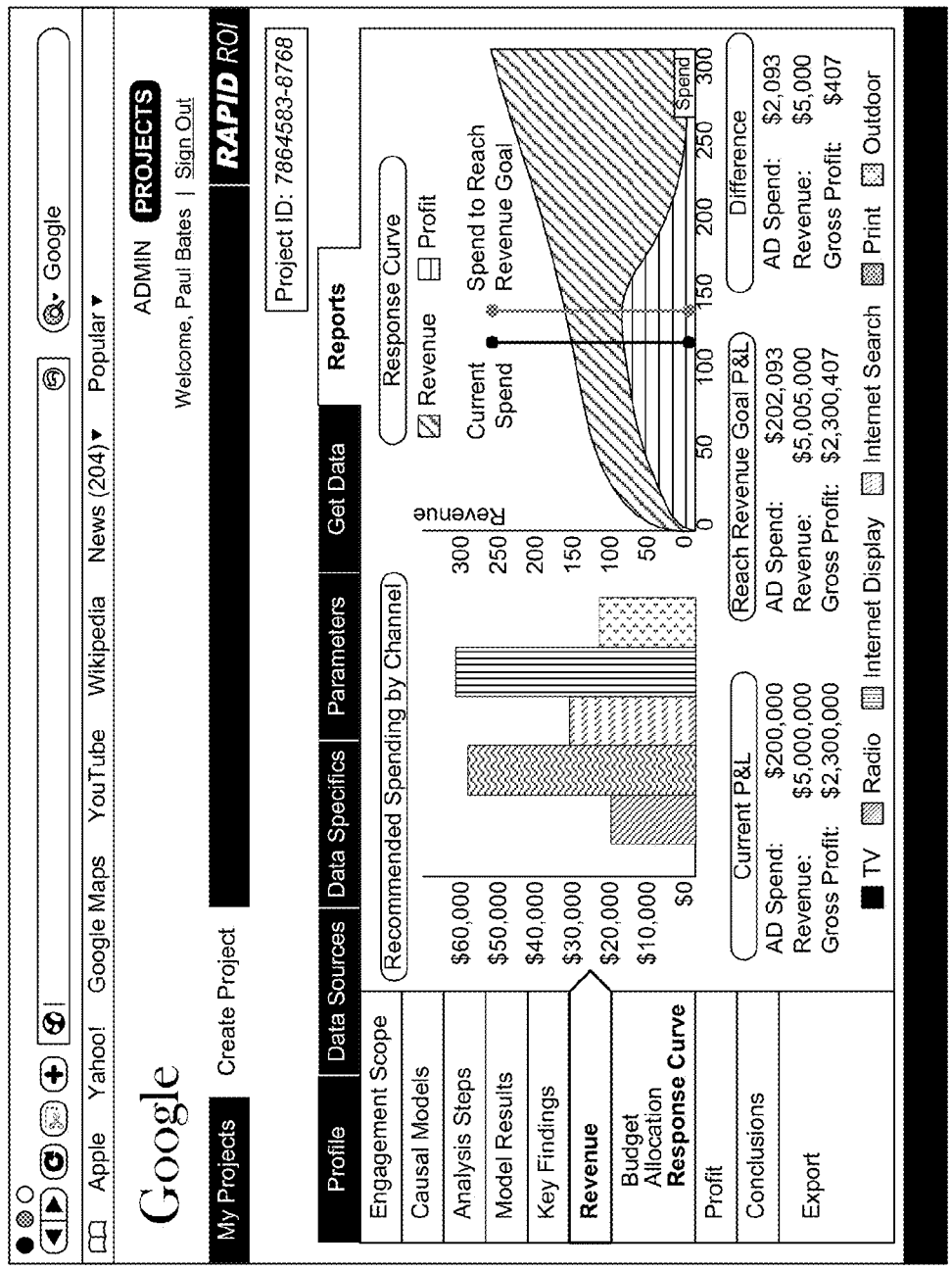

FIG. 31 shows a report indicating the current resource allocations to different marketing activities, as well as the current business results. FIG. 32 is a report showing a recommended resource allocation in comparison to the current resource allocation, as well as showing the expected difference in business results. FIG. 33 is a report showing recommended resource allocation, as well as business results projected for different possible levels of total marketing spending.

Figure 34:
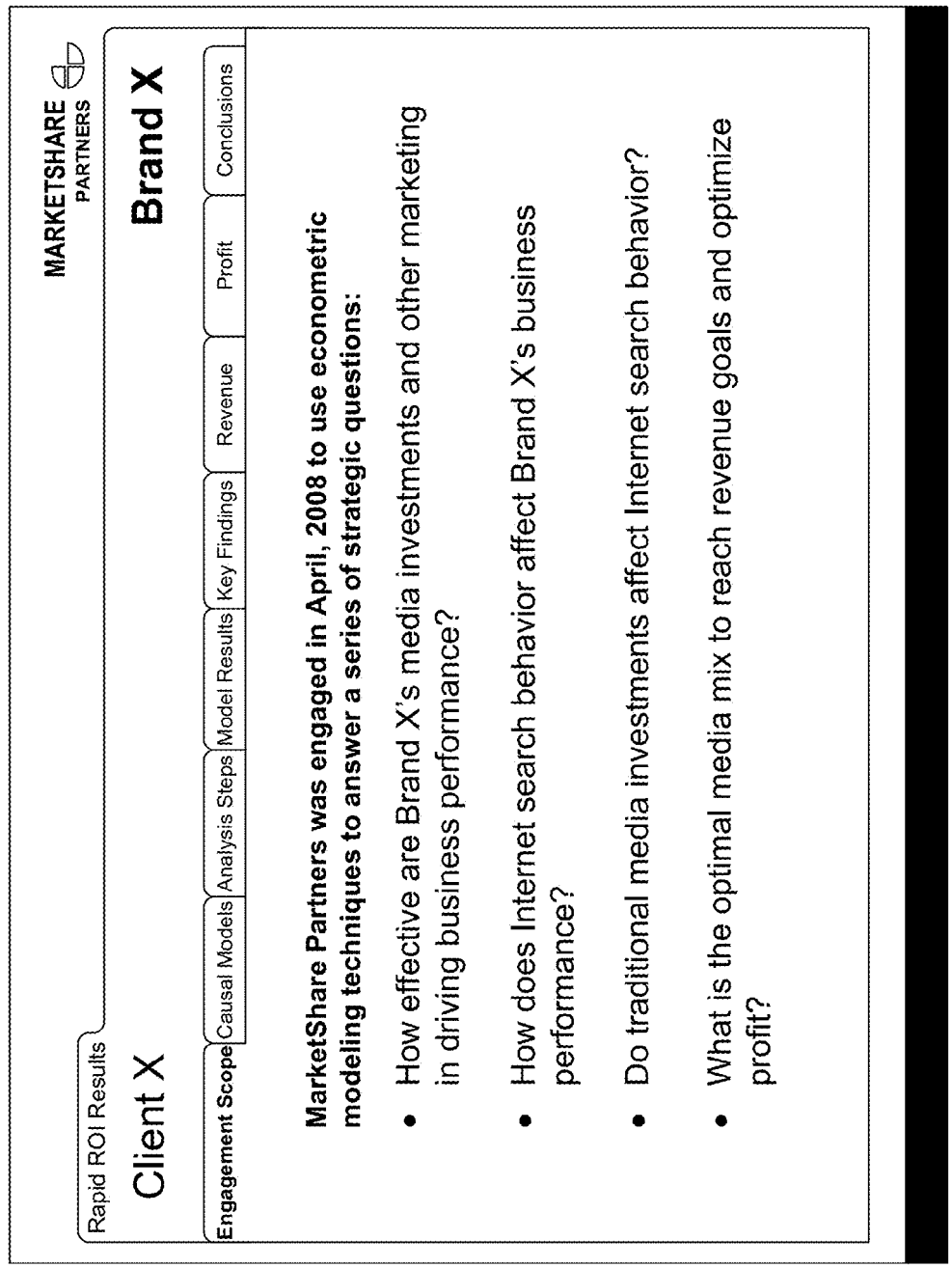

FIG. 34 shows a set of questions set to be answered by the ACE technique.

Figure 35:
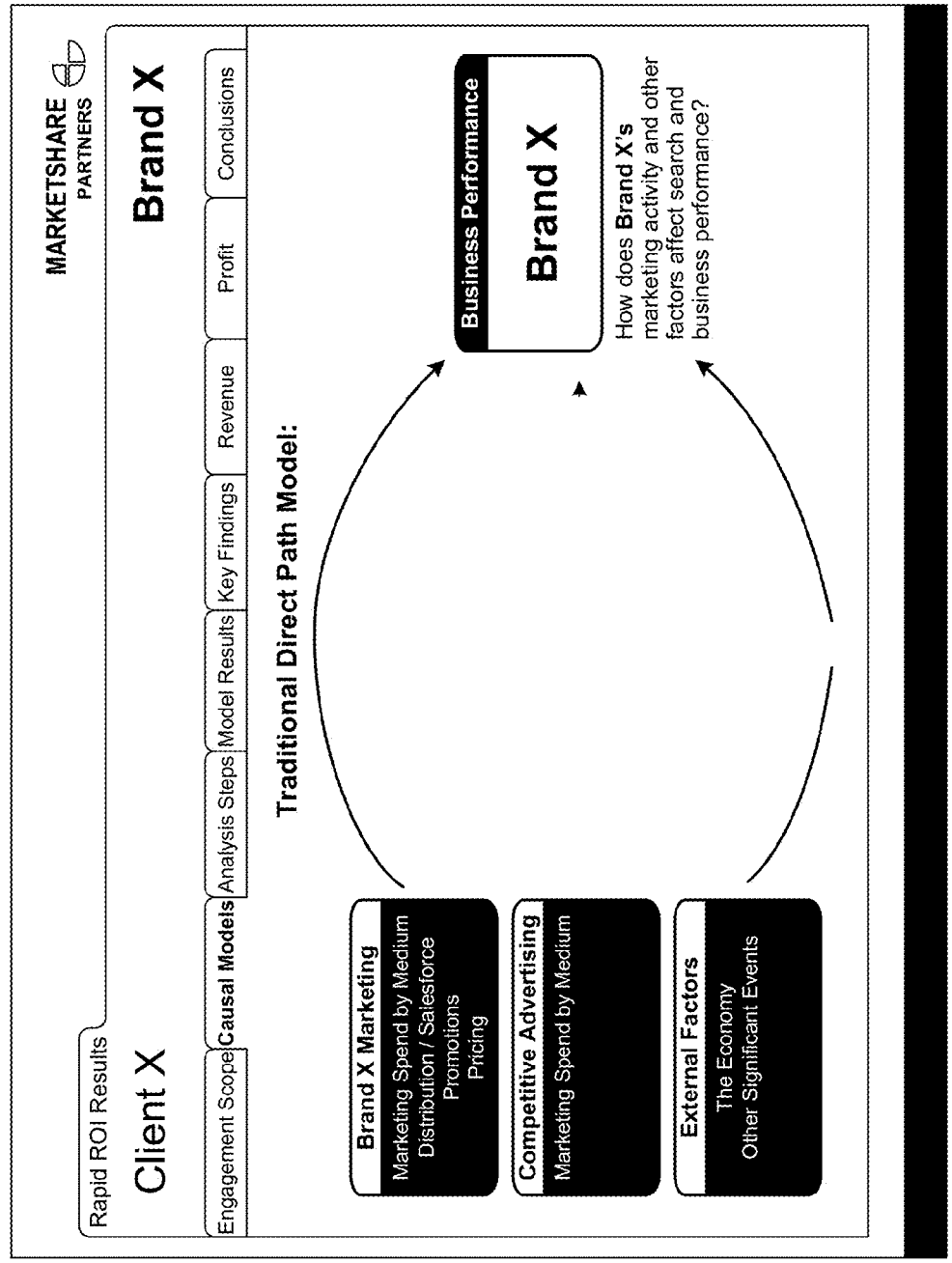
Figure 36:
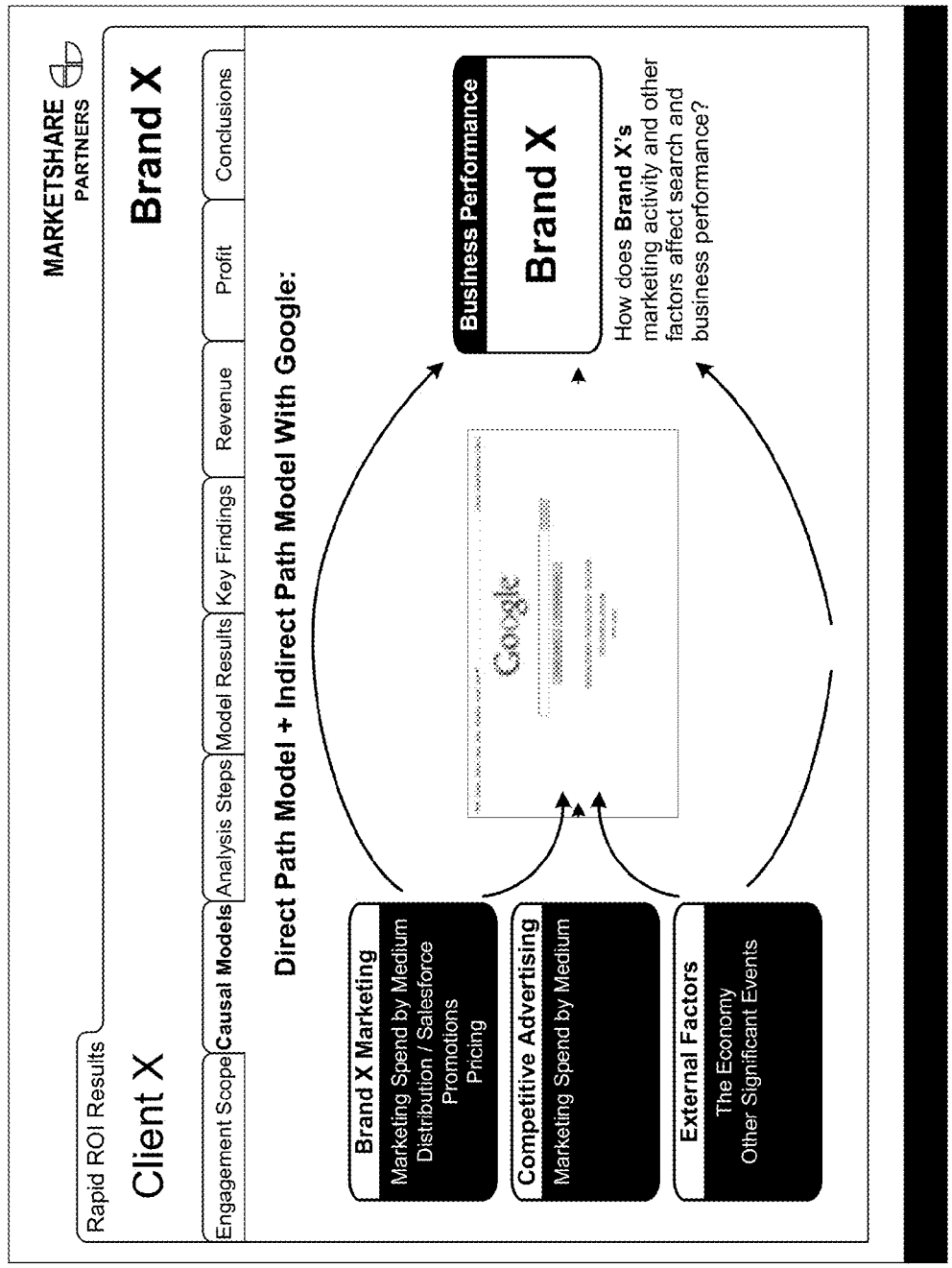
Figure 37:
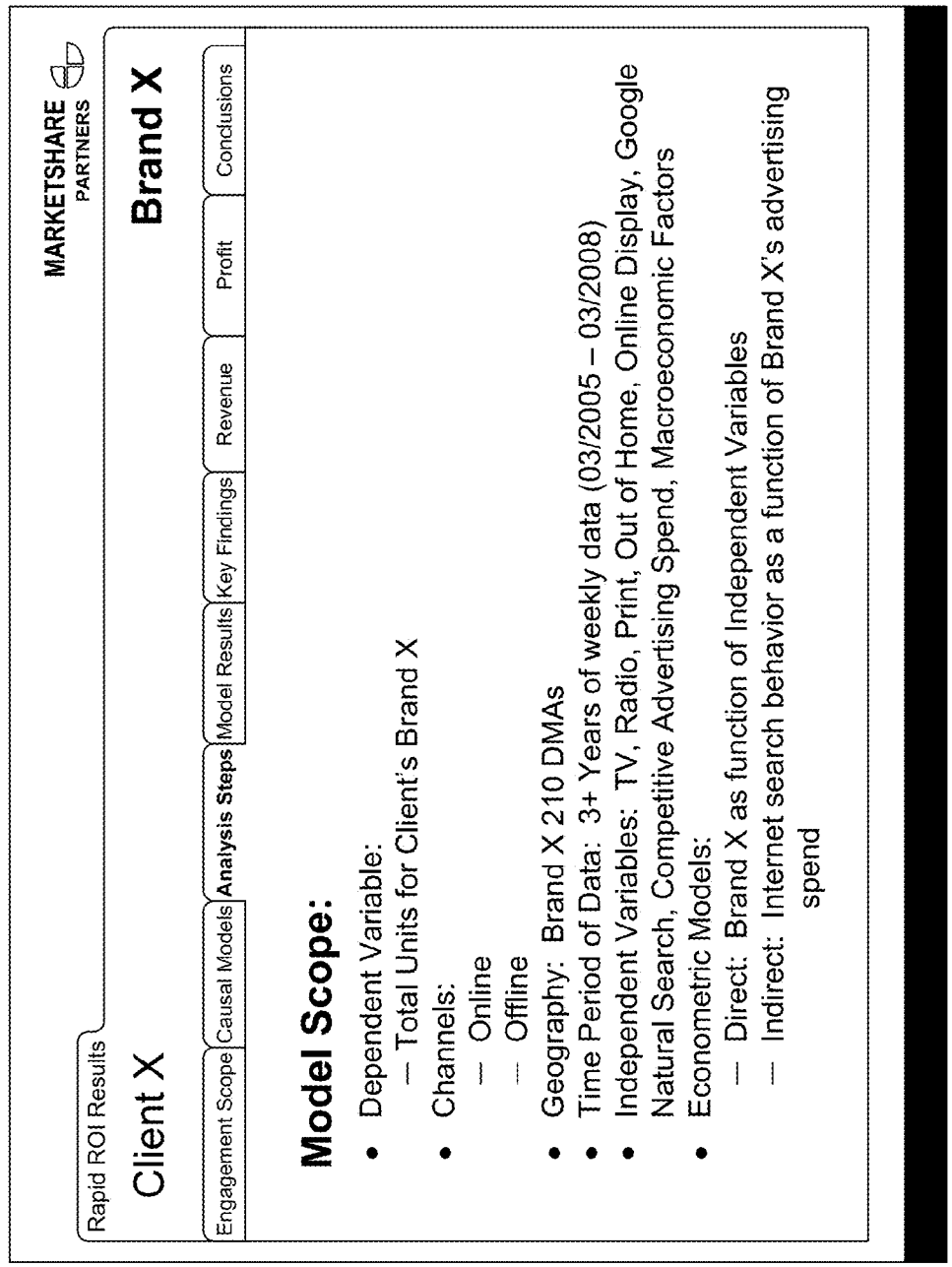

FIG. 35 shows a direct path model in which different marketing activities are understood to independently drive business performance. FIG. 36 shows an indirect path model in which certain types of marketing are understood to drive internet searching, which in turn drives business results. FIG. 37 outlines an analytical approach that applies these two models together.

Figure 38:
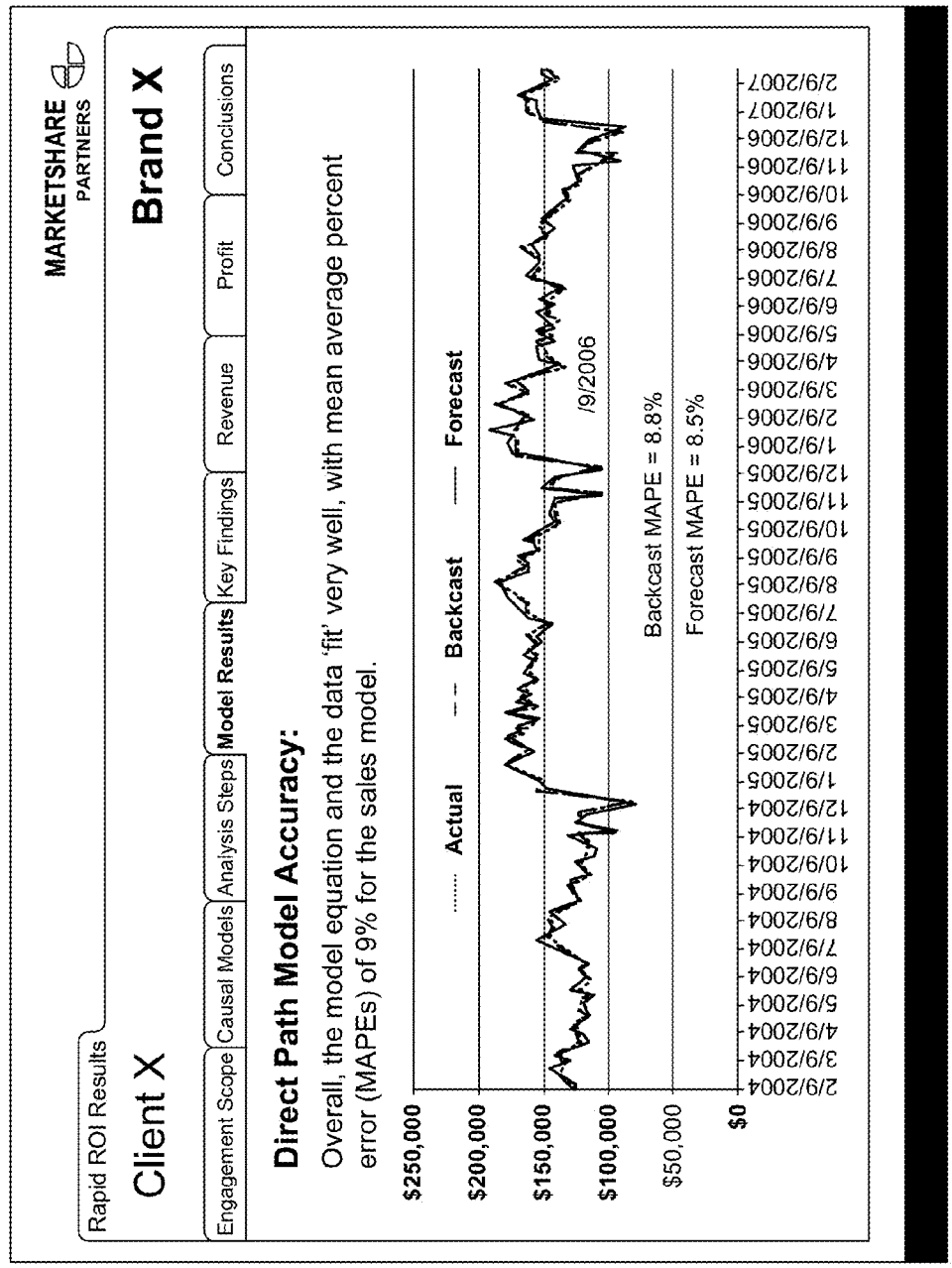

FIG. 38 shows the measures accuracy of the direct path model.

Figure 39:
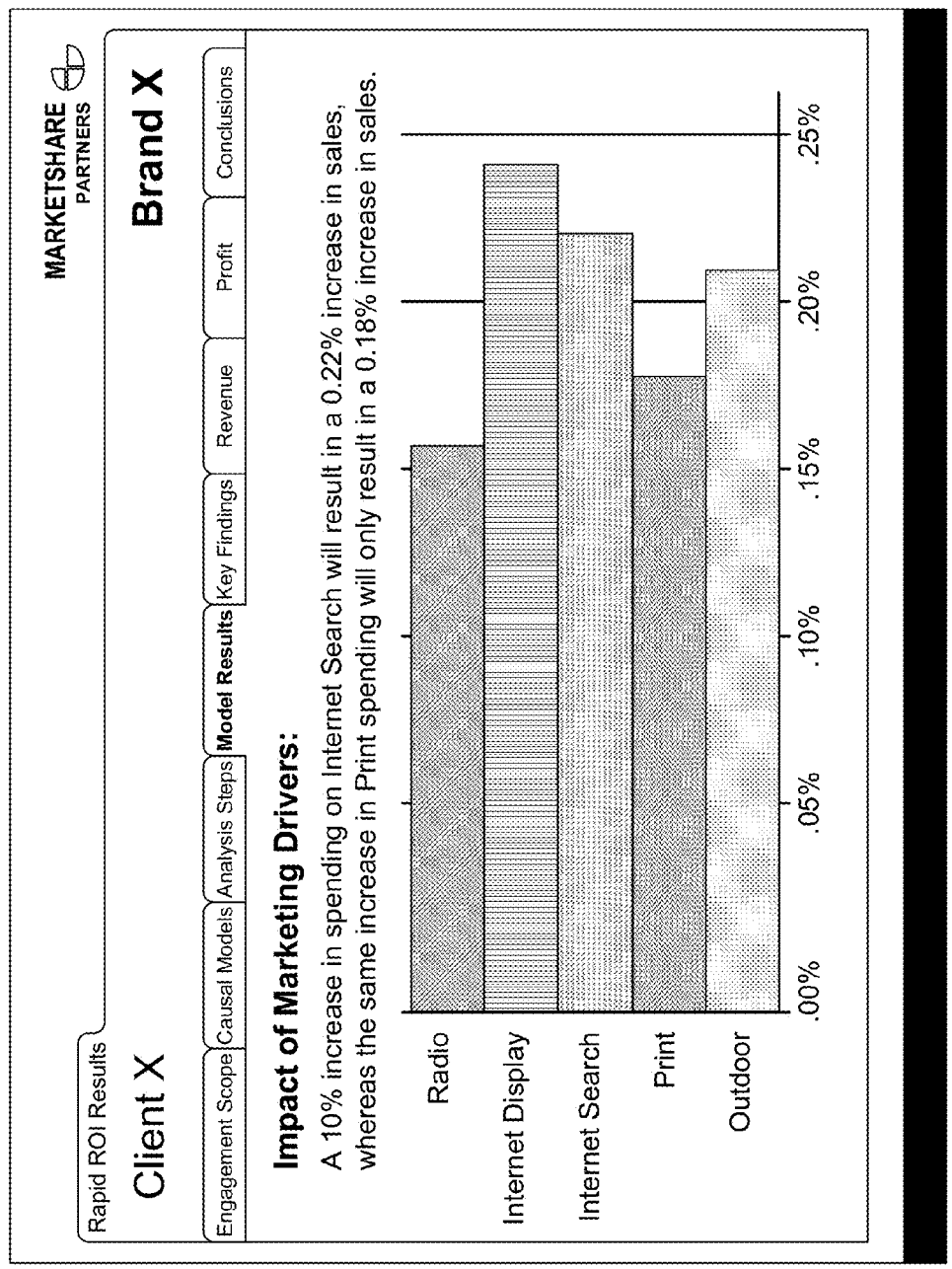
Figure 40:
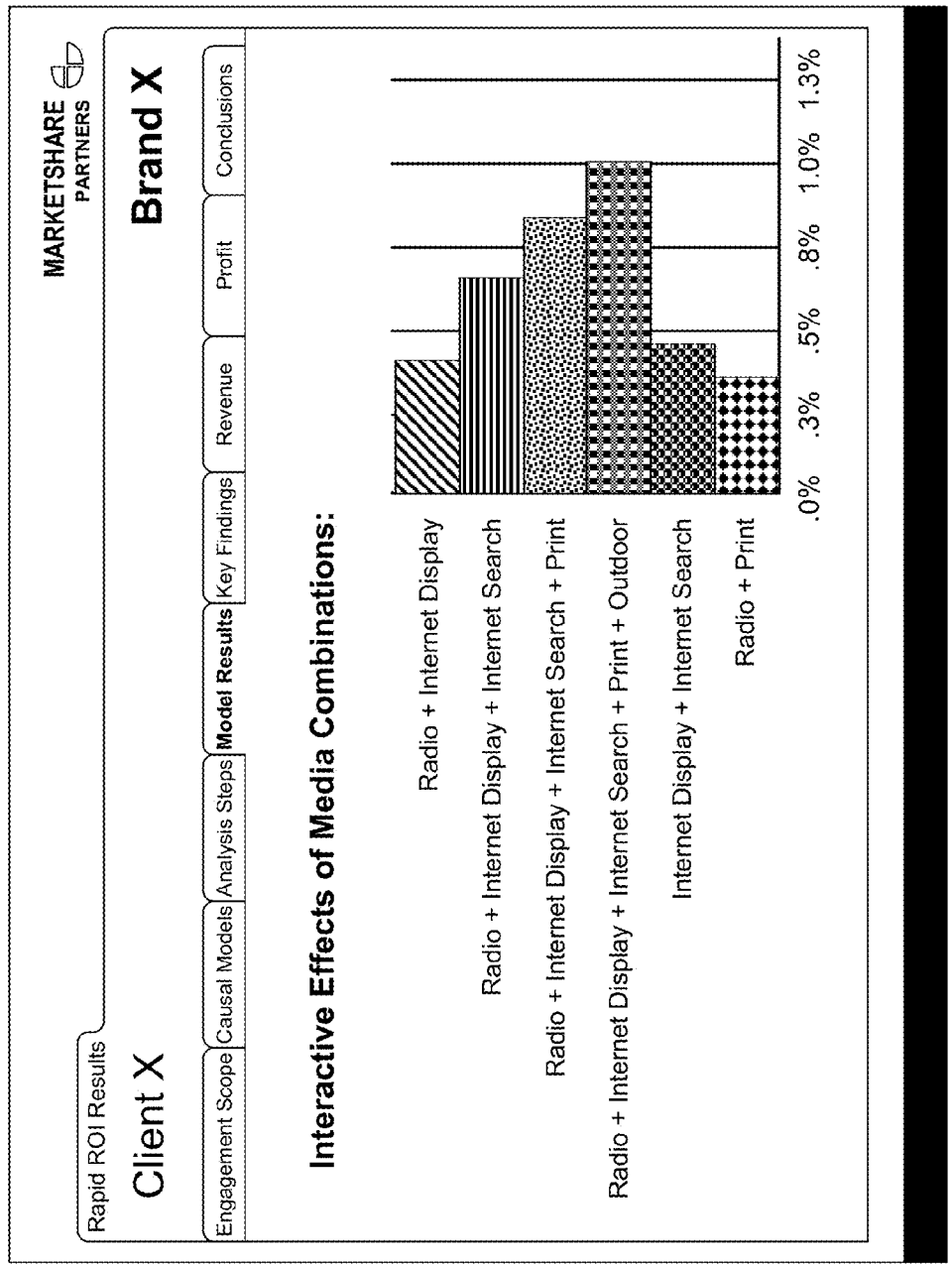
Figure 41:
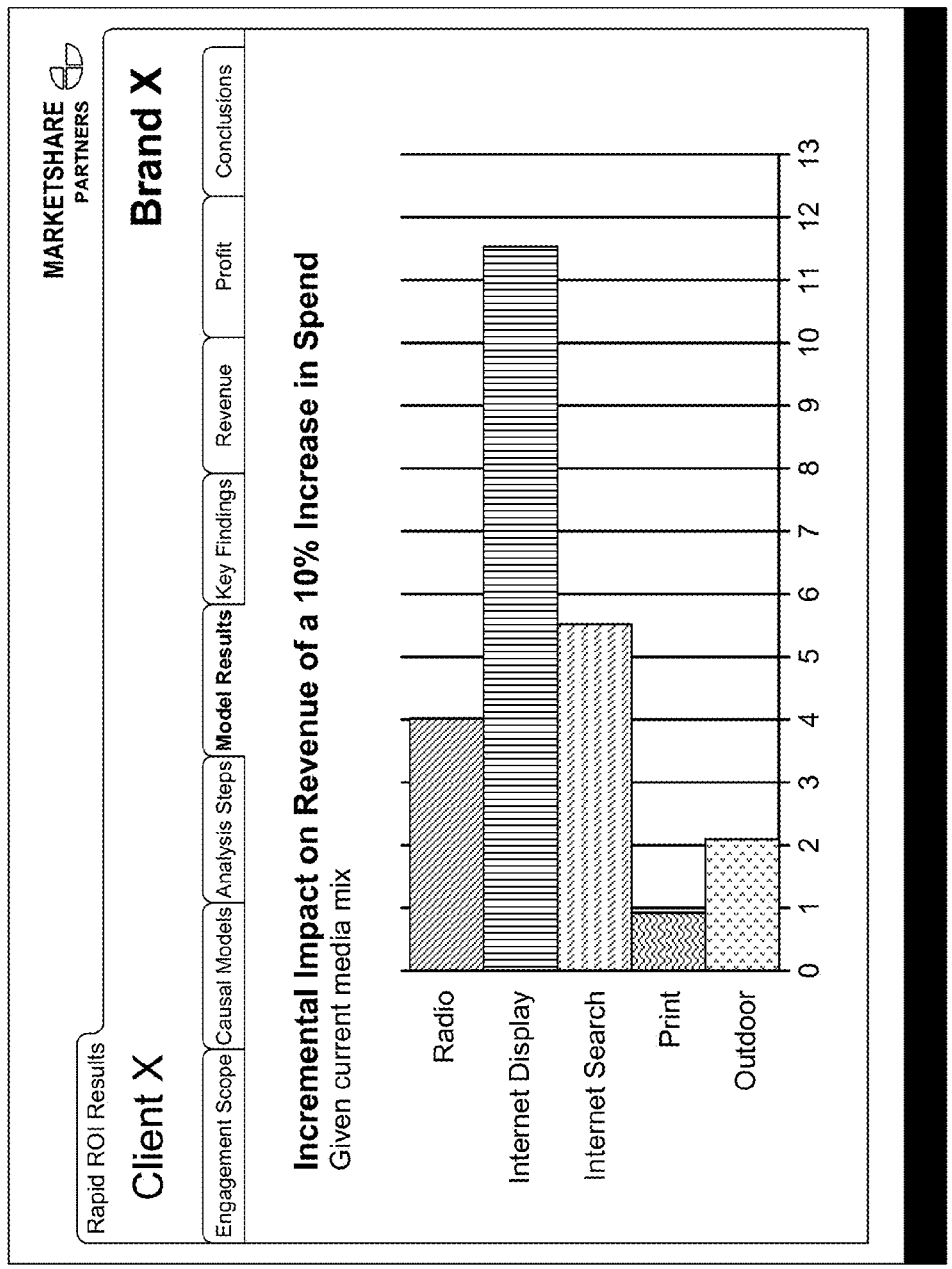

FIG. 39 shows the relative quantitative impact, or "lift," of different forms of marketing activities. FIG. 40 shows the quantitative extent to which certain marketing activities interact or synergize when employed together. FIG. 41 shows the anticipated effect of an incremental increase in the allocation to one of the forms or marketing.

Figure 42:
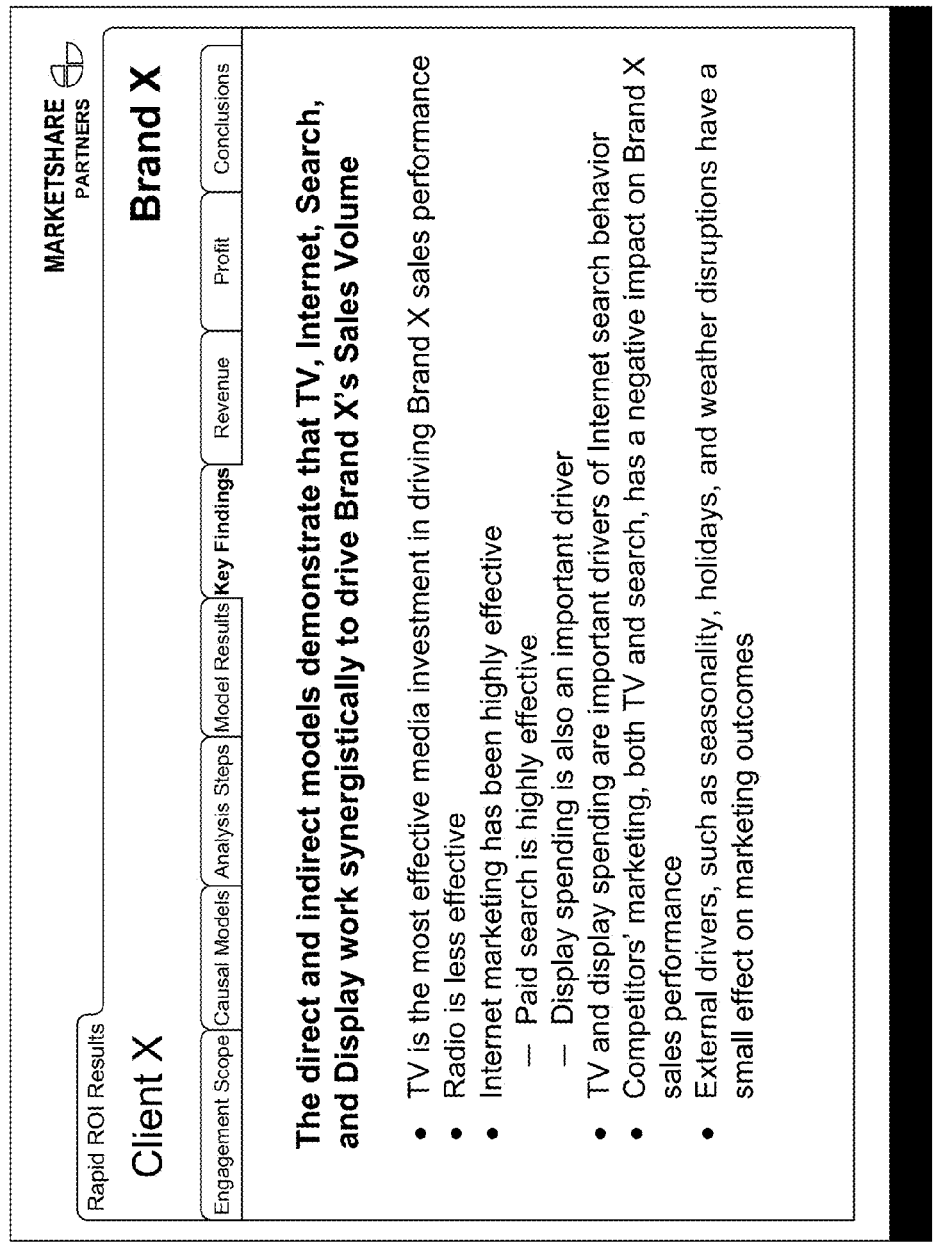

FIG. 42 shows certain conclusions about the direct and indirect path models.

Figure 43:
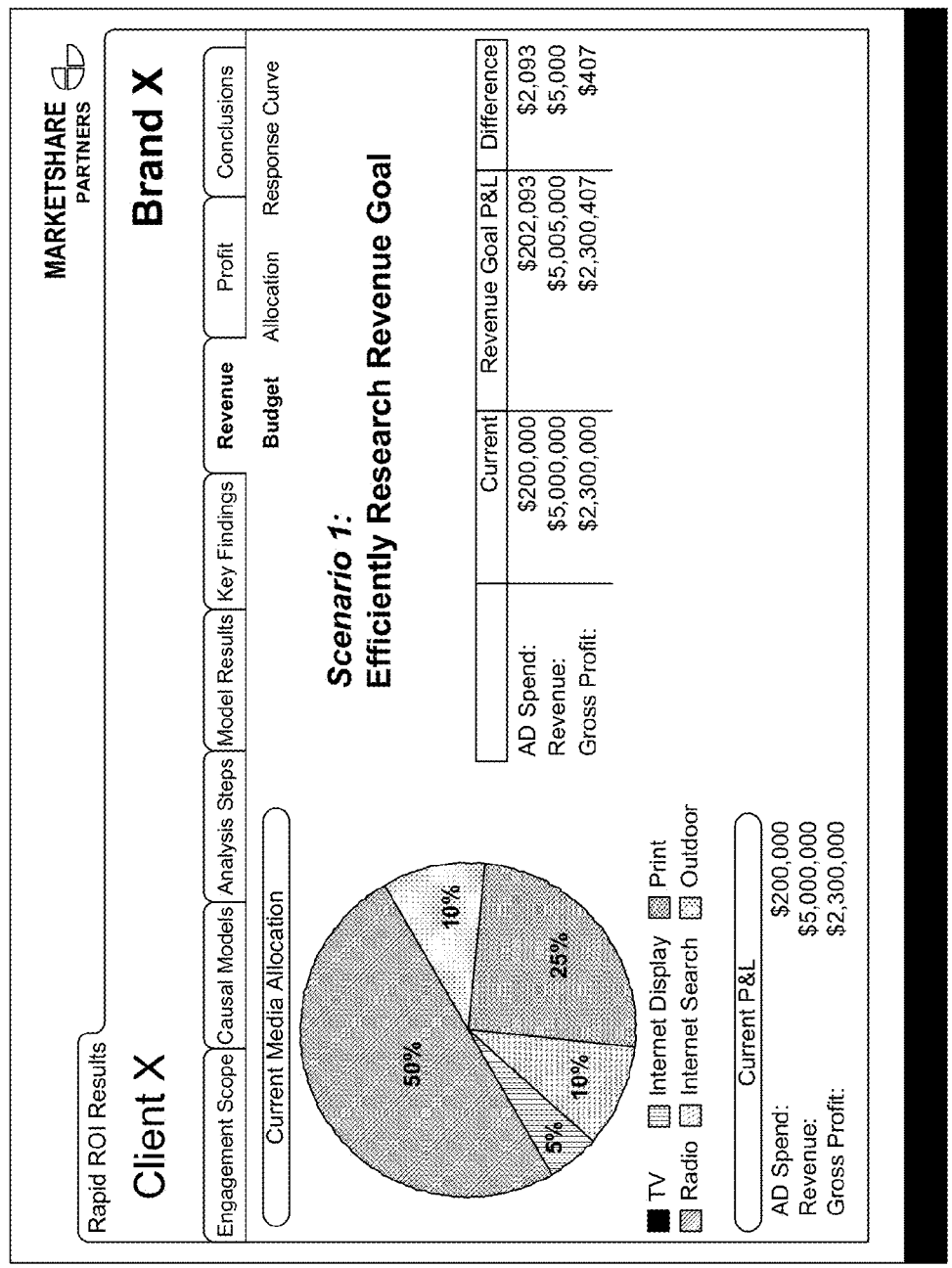
Figure 44:
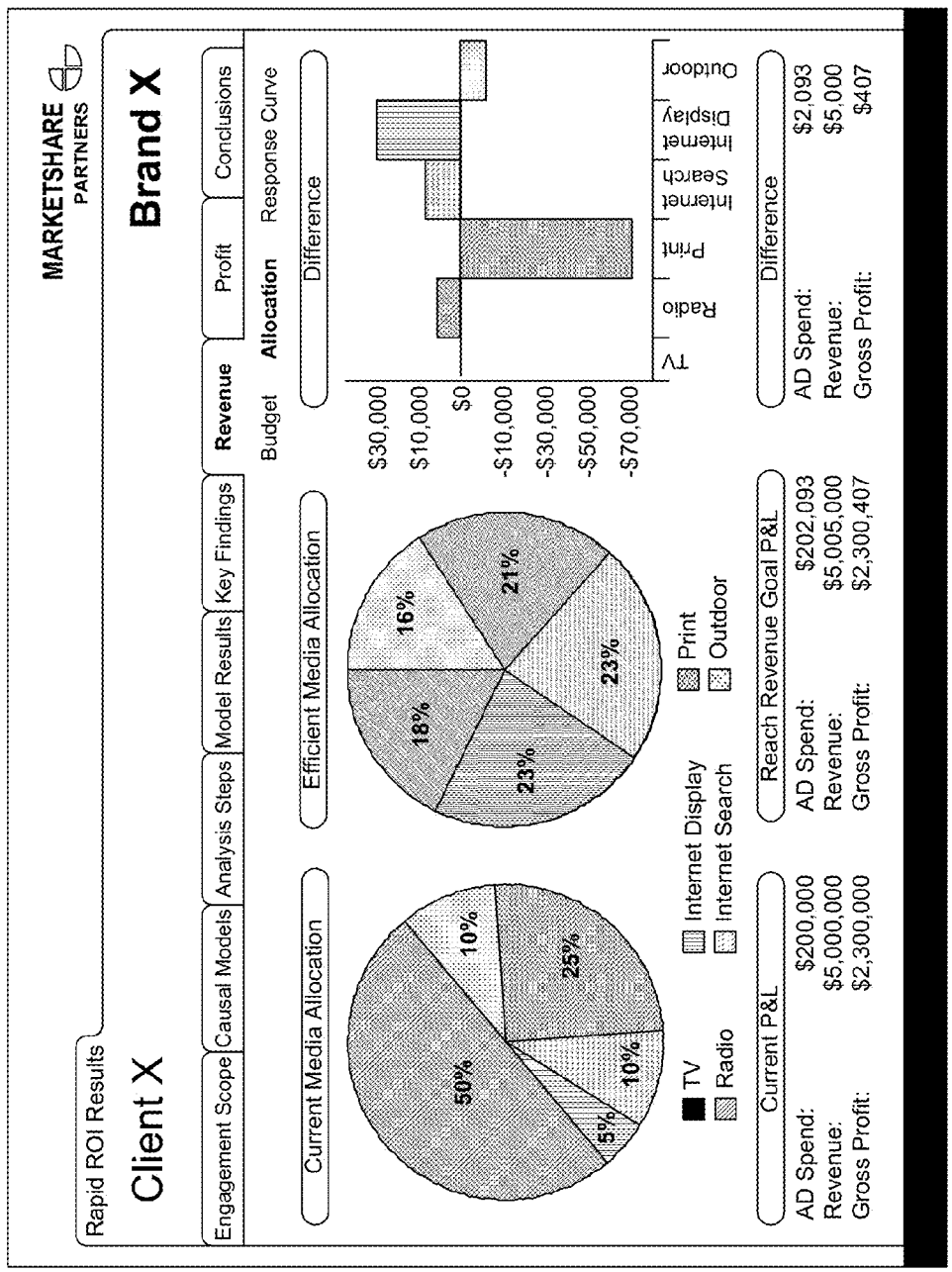
Figure 45:
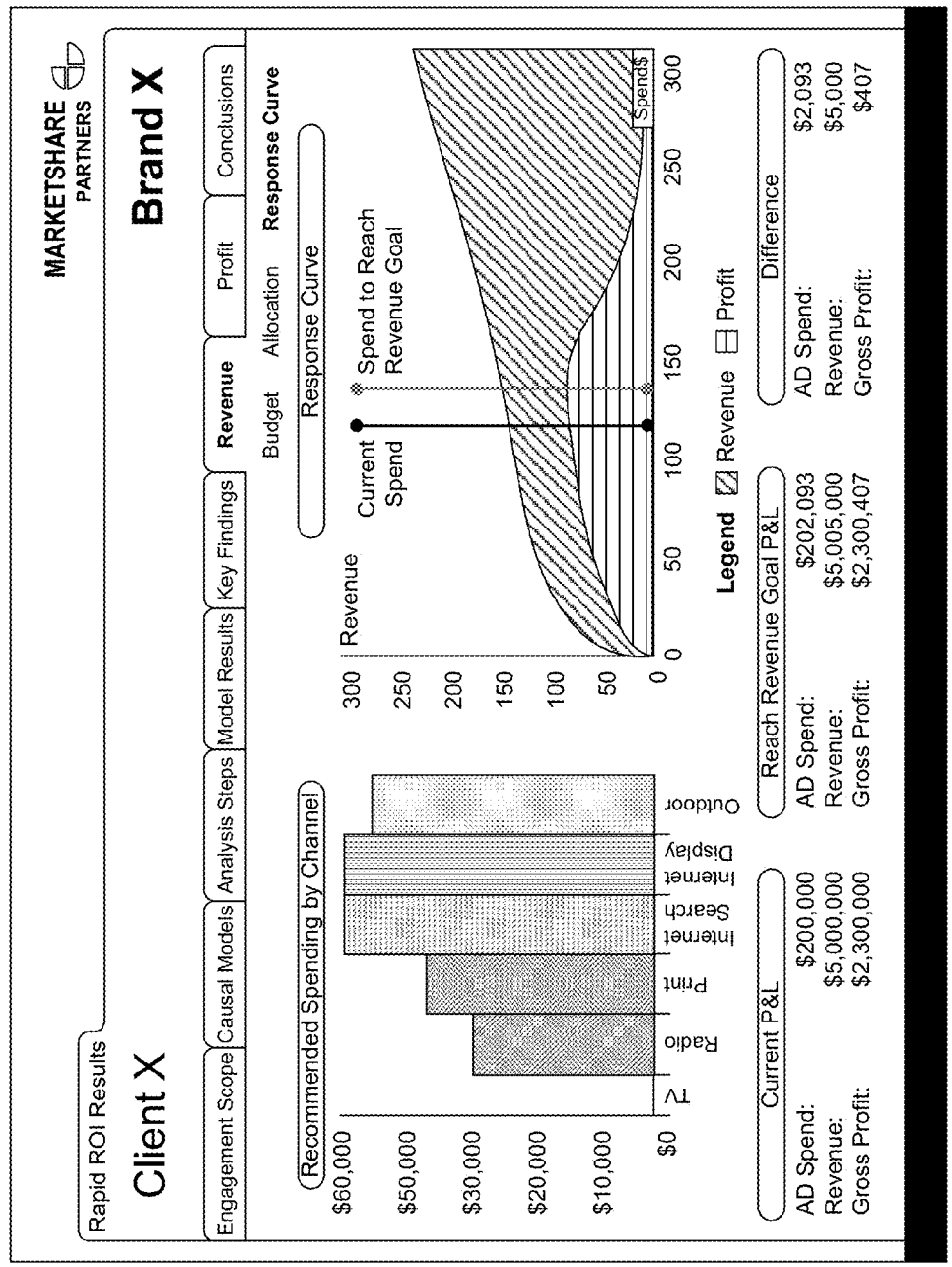

FIGS. 43-48 show two sets of reports for the same client, brand, and time period. The first set, entitled "SCENARIO 1," shows recommended allocations in order to reach a particular revenue goal with the smallest possible total marketing spend. FIG. 43 shows the current allocation, relative to the current level of revenue. FIG. 44 shows a recommended allocation, compared with the current allocation. FIG. 44 further shows the expected difference between the current business results and the business results predicted for the recommended allocation. FIG. 45 shows the anticipated level of business results for each of a number of levels of total marketing spending.

Figure 46:
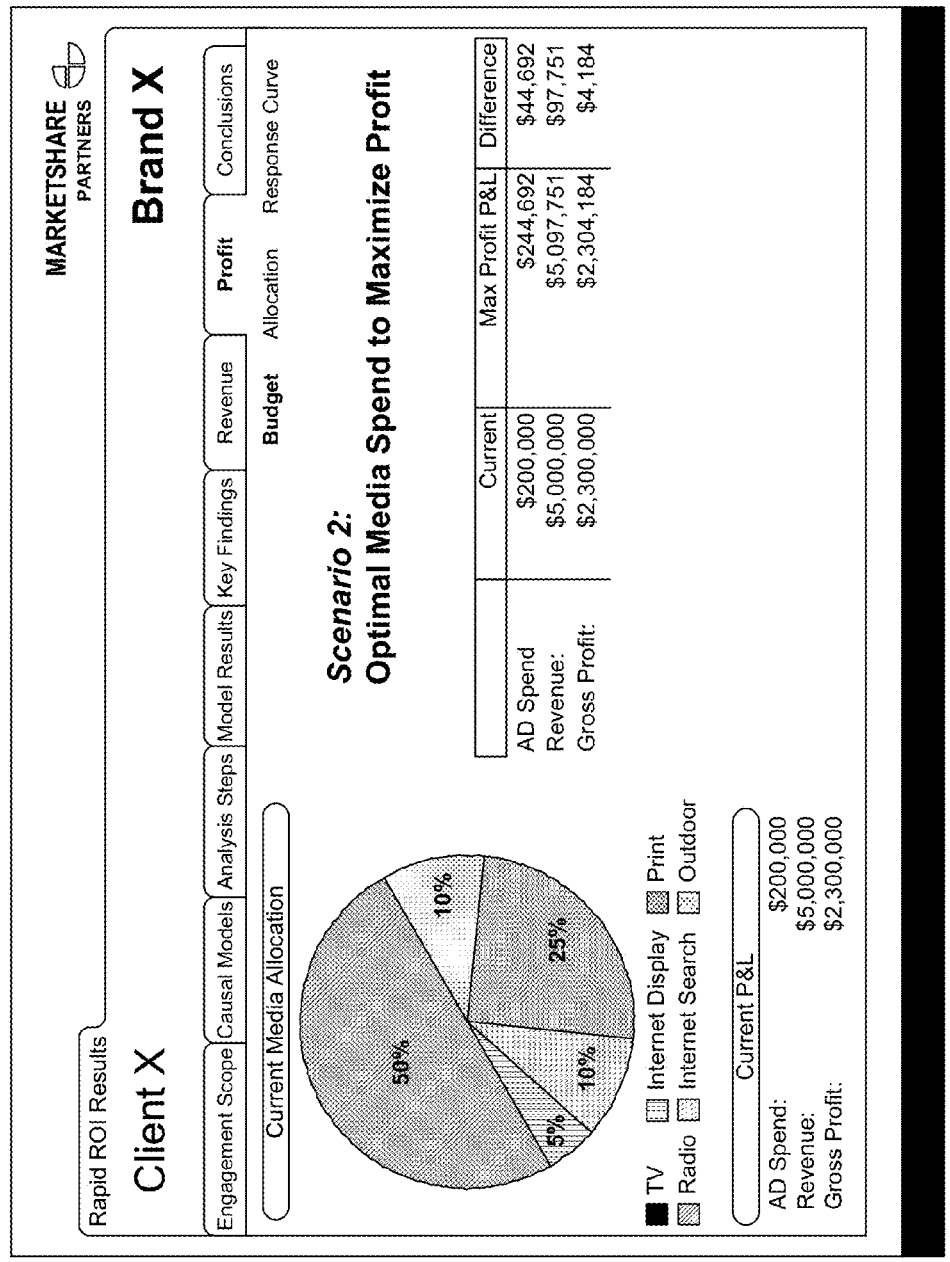
Figure 47:
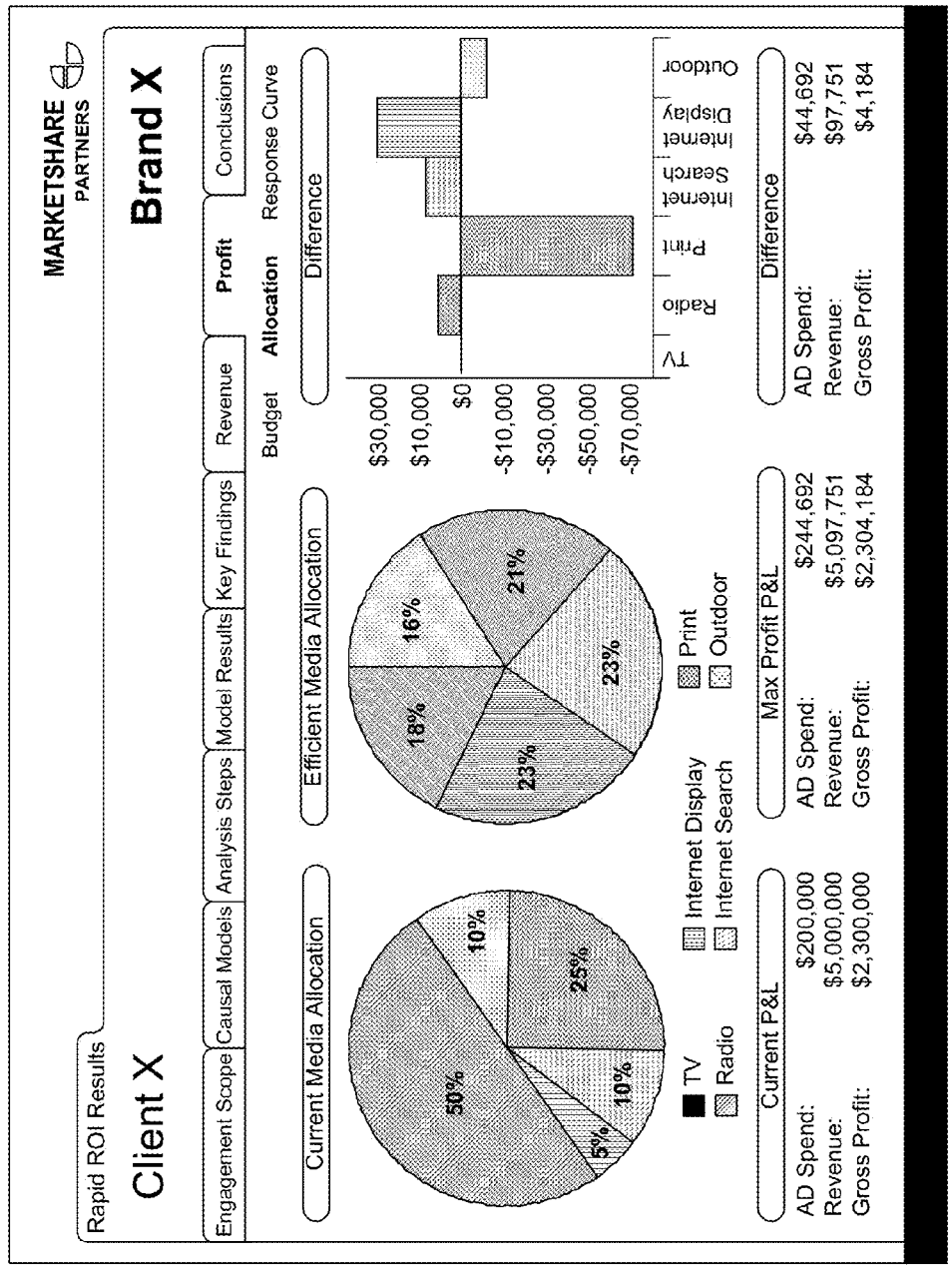
Figure 48:
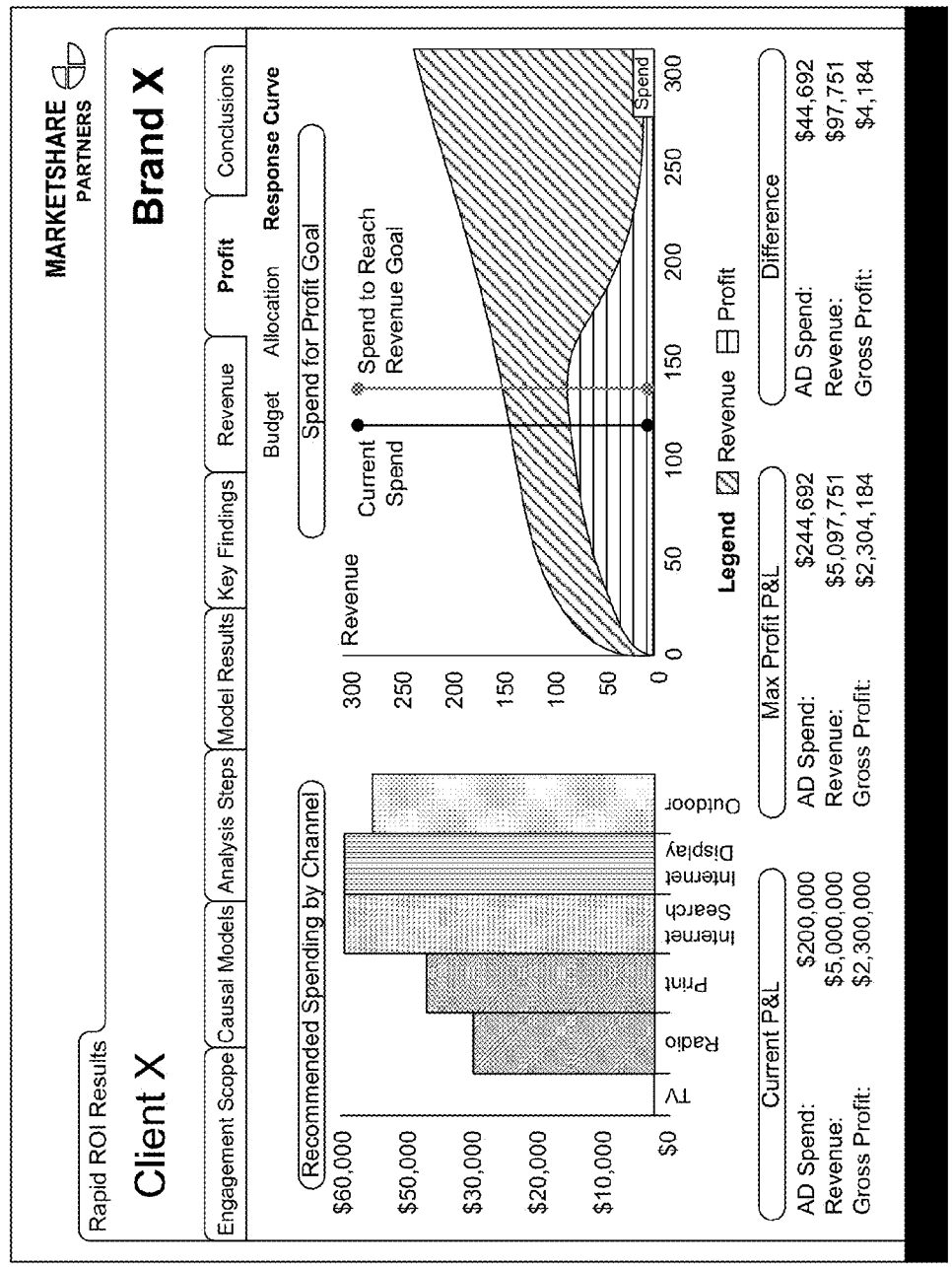

The second set of reports, entitled "SCENARIO 2," shows allocations that are optimized in order to maximize the total profit. FIG. 46 shows current allocations. FIG. 47 shows recommended allocations for scenario 2 compared to the current allocation, as well as an indication of the expected relative business results from the recommended allocation. FIG. 48 shows, for each of a number of different total marketing spending levels, but expected business results at that level.

Figure 49:
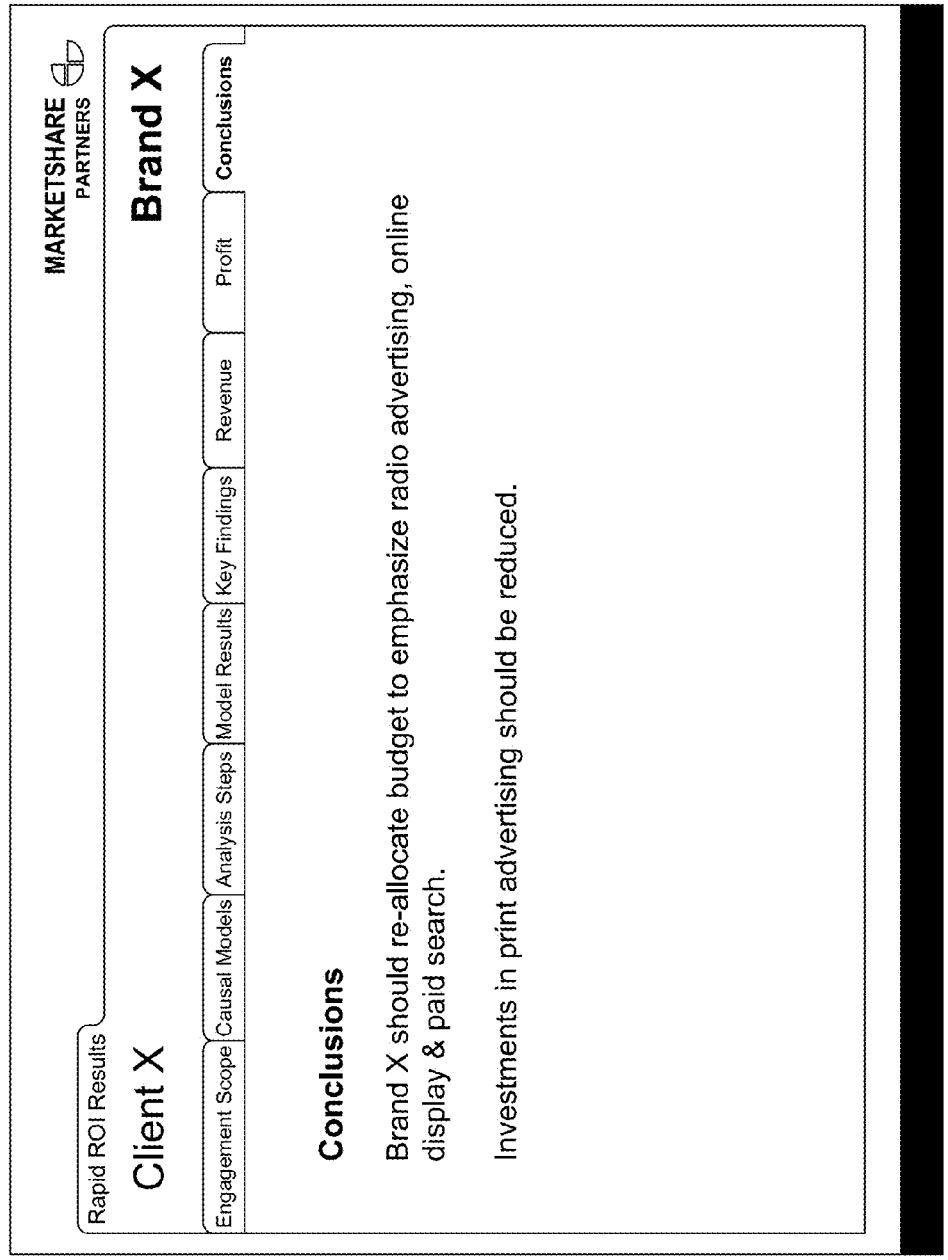

Automated Specification, Estimation, Discovery of Causal Drivers and Market Response Elasticities or Lift Factors FIG. 49 shows conclusions produced by the facility for the client.

In some embodiments, the facility performs a method of automated specification of models, estimation of elasticities, and discovery of drivers using the framework(s) discussed elsewhere herein.

The facility first obtains the client, business, and/or brand goals in terms of profit optimization, volume or revenue goals, acquisition of new customers, retention of customers, share of wallet and upsell. In conjunction with these goals, the facility obtains cross-section meta-data related to the planning time horizon, markets, geographies, channels of trade and customer segments. In combination, the goals and meta-data define the structure of the data stack and the number of demand generation equations that are needed.

1) As described elsewhere, the driver dataset includes variables within and across pre-defined functional information classes. These classes include economic conditions, weather and seasonality, competitive factors, product innovation, distribution, tracking and awareness, momentum indicators, pricing, marketing communications and the main advertising media both offline and online, internet data if applicable, sales force, channel development funds and others.

2) Data sources for the driver dataset discussed above are described in a Data Dictionary. The facility provides a way to upload, download and manage the external and information flow of the analyses as they proceed.

3) Each data class includes one or more standard data template files. The meta-data inside each file on each record provides identification of the content of each data record. The facility includes a set of Extract, Transform, and Load (ETL) macros/procedures.

4) The facility executes ETL macros to construct an econometrics-ready matrix (n×k dimensions) and data stack. Typically, the data stack uses a combined time-series and cross-section design. The rows are data records (n observations); the columns (k) are the outcome variables and the driver variables.

5) The facility codes each variable with its respective class "role." A set of relevant time lags and express additional columns in the stack are also pre-defined to carry lagged variables, both lagged dependent variables and lagged driver variables.

6) The facility uses a 2-step hierarchical method for optimization. Step 1 ensures compliance with a set of business rules defined below. Step 2 ensures statistical confidence and compliance with best methods.

7) The facility uses a class of econometric models described as multiplicative. Sales revenue is described as a function of base volume as well as each driver variable and its associated elasticity. This specification includes both offline and online marketing and more.

8) In order to estimate the elasticity parameters, the facility uses natural logarithms to transform both the outcome variables and the driver variables. The resulting regression equation is then linear in the parameters. A small constant is added to zero values in the database.

9) The transform step in ETL performs the specified transformation and assembles the data stack. The data stack contains N records of data observations and K explanatory variables. Each candidate driver variable is a column vector.

10) The facility uses a generalized least squares (GLS) technique to estimate the parameters, including fixed effects using cross-section weights. In some embodiments, the facility stacks multiple equations; this is known as Seemingly Unrelated Regression (SUR). In some embodiments, the facility solves simultaneous equations using 2SLS, 3SLS, or maximum likelihood methods.

11) The facility uses automated macros to conduct each of the steps outlined above, as well as tables and graphical outputs.

12) The facility uses a multi-goal seeking method to select and recommend the best specification and parameter estimates based on the following hierarchy of objectives: simplicity, business logic, statistical quality, and stability. Each objective corresponds to a set of characteristics.

13) Holding other factors the same, simplicity means that the facility uses the smallest set of driver variables which deliver the other goals, meaning the least possible number of driver variables while covering the main driver classes.

14) The core business logic is that the sales response curve is either convex (increasing returns), concave (diminishing returns) or S-shapes. These conditions are governed by the value of the response elasticities. Most drivers, including advertising, are expected to have an elasticity less than 1 (concave). Prices, price promotions, distribution and some economic variables may have elasticity greater than 1 (convex). In addition, the numerical signs on the resource drivers, except pricing, must be positive according to microeconomic theory. Also, price elasticity must have a negative sign.

15) In some embodiments, the facility incorporates a non-zero coefficient in the estimated equation for at least one driver variable from each class:

| Driver Class | Required |
| --- | --- |
| Economy | X |
| Distribution | X |
| Seasonality | X |
| Competition | X |
| Share of Voice | X |
| Pricing | X |
| Marcom Offline | X |
| Marcom Online | X |
| Salesforce, if applicable | X |
| Channel funds, if applicable | X |
| Dummy and/ interaction indicator variables | X |

The elasticity library used by the facility is a database of similar models and elasticities. The facility also requires that any candidate equation and its parameters fall within the range of elasticity norms from the elasticity library for the associated brand or service meta-data.

16) The facility measures statistical quality—i.e., confidence level—on several dimensions. One is the absence of statistical problems including serial correlation, collinearity and widely differing variances (heteroscedsasticity). A second quality indicator is "fit" as measured by $R^{**}2$ techniques. The most important quality measures tend to be the individual statistical reliability of each response coefficient (i.e., high t-values with corresponding low p-values).

17) The facility assesses the stability of the parameter estimates using a recursive window technique, in which a base model is estimated using a minimum number of observations. Then subsequent observations are added, one at a time, and parameter stability is assessed. If instability is discovered, the facility flags the problem for analyst intervention.

18) The facility also conducts standard tests for endogeneity and causality, such as the Hausman test and the Granger test.

19) The required statistical diagnostics include:

| Statistical Diagnostics | Required |
| --- | --- |
| $R^{**}2$ | >.7 |
| t-values/p-values for coefficients | t-values >1.65.0 or <−1.65 |
| Durbin-Watson | 1.85-2.05 |
| Collinearity | Acceptable level |
| Hausman | pass |
| Granger | pass |
| Unit Roots | stationarity |

20) The facility Iterations and Marcom-Centric Goal-seeking

For k driver variables, there are $k^{**}2/2-1$ combinations of driver variables and corresponding equations to be estimated, where lags are included in k. The facility conducts estimation and classification of each candidate equation and "scores" the candidate relative to the rules above.

Assuming compliance with the business and statistical confidence rules, the facility will select and recommend a final equation with the best possible t-values for the Marcom major components (offline, online) which are consistent with corresponding elasticity library "norms" and meta-data.

It will be appreciated by those skilled in the art that the above-described facility may be straightforwardly adapted or extended in various ways.

The invention claimed is:

1. A system, having a memory, for constructing a demand generation equation to predict for an offering a level of demand that will be generated by allocating particular levels of resources to different marketing activities, comprising:
- a component configured to receive a plurality of observations from a user;
- a component configured to, for each of at least two of the plurality of observations:
  - for each of a plurality of candidate driver variables, retrieve a value for the candidate driver variable as it relates to the observation, and
  - for each of at least one outcome variable, retrieve a value for the outcome variable as it relates to the observation;
- a component configured to estimate, using the variable values retrieved for the observations, an equation that relates the candidate driver variables to the outcome variable to produce coefficients for each of the candidate driver variables; and
- a component configured to conduct statistical diagnostics on the estimated equation to validate the estimated equation,
- wherein the component configured to conduct statistical diagnostics comprises a component configured to determine whether the estimated equation falls within the range of elasticity norms from an elasticity library, and
- wherein at least one of the components comprises computer-executable instructions stored in the memory for execution by the system.

2. The system of claim 1 wherein each of the candidate driver variables falls into a candidate driver variable class, and wherein the component configured to estimate is configured to estimate under the constraint that at least one candidate driver variable in each candidate driver variable class must have a non-zero coefficient.

3. The system of claim 1, wherein the component configured to conduct statistical diagnostics comprises a component configured to verify compliance with at least two pre-determined business or statistical confidence rules.

4. The system of claim 3, further comprising:
- a component configured to apply the estimated equation to candidate driver variable values and outcome variable values not among those retrieved to validate the estimated equation.

5. A computer-readable storage medium storing instructions that, if executed by a computing system having a processor, cause the computer system to perform operations for constructing a demand generation equation to predict for an offering a level of demand that will be generated by allocating particular levels of resources to different marketing activities, the operations comprising:
- receiving a plurality of observations from a user;
- for at least two of the plurality of observations:
  - for each of a plurality of candidate driver variables, retrieving a value for the candidate driver variable as it relates to the observation, and
  - for each of at least one outcome variable, retrieving a value for the outcome variable as it relates to the observation;
- using the variable values retrieved for the observations, estimating an equation that relates the candidate driver variables to the outcome variable to produce coefficients for each of the candidate driver variables; and
- conducting statistical diagnostics on the estimated equation to validate the estimated equation,
- wherein conducting statistical diagnostics on the estimated equation to validate the estimated equation comprises determining whether the estimated equation falls within the range of elasticity norms from an elasticity library.

6. The computer-readable storage medium of claim 5 wherein the estimating is performed by stacking multiple equations under the Seemingly Unrelated Regression technique or by solving simultaneous equations using 2SLS, 3SLS, or maximum likelihood methods.

7. The computer-readable storage medium of claim 5 wherein each of the candidate driver variables falls into a candidate driver variable class, and wherein estimating is performed under the constraint that at least one candidate driver variable in each candidate driver variable class must have a non-zero coefficient.

8. The computer-readable storage medium of claim 7, wherein the step of conducting statistical diagnostics on the estimated equation to validate the estimated equation comprises verifying compliance with at least two pre-determined business or statistical confidence rules.

9. The computer-readable storage medium of claim 5, the operations further comprising:
- applying the estimated equation to candidate driver variable values and outcome variable values not among those retrieved to validate the estimated equation.

10. One or more computer memories collectively storing a demand generation equation data structure to predict for an offering a level of demand that will be generated by allocating particular levels of resources to different marketing activities, the demand generation equation data structure comprising:
- a plurality of observations received from a user;
- for at least two of the plurality of observations:
  - a plurality of candidate driver variables, and a value for the candidate driver variable as it relates to the observation, and
  - at least one outcome variable, and a value for the outcome variable as it relates to the observation;
- a demand generation equation that relates the candidate driver variables to the outcome variable to produce coefficients for each of the candidate driver variables, wherein the demand generation equation is estimated using the variable values retrieved for the observations;
- an elasticity library;
- coefficients for each of the candidate driver variables; and at least two statistical diagnostic results generated from conducting statistical diagnostics on the demand generation equation to validate the demand generation equation,
- wherein conducting statistical diagnostics on the demand generation equation comprises determining whether the demand generation equation falls within the range of elasticity norms from the elasticity library.

11. The one or more computer memories of claim 10, wherein each of the candidate driver variables falls into a candidate driver variable class, and wherein the demand generation equation is further estimated under the constraint that at least one candidate driver variable in each candidate driver variable class must have a nonzero coefficient.

12. The one or more computer memories of claim 10, wherein the at least two statistical diagnostic results are further generated by verifying compliance with at least two pre-determined business or statistical confidence rules.

13. The one or more computer memories of claim 10, the demand equation data structure further comprising:
- coefficients for candidate driver variables other than the plurality of candidate driver variables.

14. The one or more computer memories of claim 13, wherein the coefficients for candidate driver variables other than the plurality of candidate driver variables are generated by applying the estimated equation to the candidate driver variables other than the plurality of candidate driver variables.

15. A method, performed by a computing system having a processor, for prescribing a total budget and allocation of marketing resources for a subject offering, the method comprising:
   during an initialization phase, collecting data relating to historical marketing efforts for a first offering other than the subject offering;
   based on the collected data, calculating an average elasticity measure indicating the impact, on a business outcome, of allocating resources to a total marketing budget for the first offering;
   deriving, with the processor, an adjustment factor for the average elasticity measure that specifies how much the average elasticity measure is to be adjusted to reflect characteristics of the historical marketing efforts;
   for each of a plurality of spending categories, deriving an elasticity measure indicating the extent to which the marketing spending category impacted the business outcome; and
   determining, with the processor, a total marketing budget for the subject offering based on the calculated average elasticity measure and the derived adjustment factor.

16. The method of claim 15 wherein the collected data comprises characteristics of the first offering, the total marketing budget for the first offering, an allocation of the total marketing budget for the first offering across spending categories, and a business outcome.

17. The method of claim 15 wherein the collecting, calculating, deriving, and identifying are each performed for a second offering, wherein determining the ideal total marketing budget is further based on the average elasticity measure calculated for the second offering, wherein the second offering is not the first offering, and wherein the second offering is not the subject offering.

18. The method of claim 15 wherein the plurality of spending categories include television, movie theatre, radio, and newspaper.

19. The method of claim 18 wherein the plurality of spending categories include outdoor, home shopping TV, product placement, airport, public transportation, sponsorship of sports events, and sponsorship of non-sports events.

20. The method of claim 19 wherein the plurality of spending categories include television, movie theatre, radio, newspapers, video game, streaming video, and interactive TV.

21. The method of claim 20 wherein the plurality of spending categories include magazine, print article, loose insert, internet advertising, internet search, brand/company website, and email.

22. The method of claim 21 wherein the plurality of spending categories include doctor's office, toll free lines, celebrity endorsement, in-store advertising, and promotion/special offer.

23. A computer-readable storage medium storing instructions that, if executed by a computer system having a processor, cause the computer system to perform operations, comprising:
   receiving a plurality of observations from a user;
   for at least two of the plurality of observations, creating a data stack comprising data observations and explanatory variables by:
      retrieving a value for a candidate driver variable as it relates to the observation, and
      retrieving a value for an outcome variable as it relates to the observation;
   estimating a demand generation equation that relates the candidate driver variable to the outcome variable to produce coefficients for the candidate driver variable using the variable values retrieved for the observations; and
   conducting statistical diagnostics on the demand generation equation to validate the demand generation equation,
   wherein conducting statistical diagnostics on the demand generation equation to validate the demand generation equation comprises determining whether the demand generation equation falls within the range of elasticity norms from an elasticity library.

24. The computer-readable storage medium of claim 23 wherein each of the candidate driver variables falls into a candidate driver variable class, and wherein estimating is performed under the constraint that at least one candidate driver variable in each candidate driver variable class must have a non-zero coefficient.

25. The computer-readable storage medium of claim 24, the operations further comprising:
   applying the estimated equation to candidate driver variable values and outcome variable values not among those retrieved to validate the demand generation equation.

* * * * *